(12) United States Patent
Ishihara et al.

(10) Patent No.: US 7,819,471 B2
(45) Date of Patent: Oct. 26, 2010

(54) RECLINING DEVICE

(75) Inventors: Yoshitaka Ishihara, Ichinomiya (JP); Takuto Esaki, Kani (JP); Kazuyoshi Hara, Kani District (JP)

(73) Assignee: Kabushiki Kaisha Imasen Denki Seisakusho, Inuyama ( * ) Notice: Subject to any disclaimer, the term of this patent is extended or adjusted under 35 U.S.C. 154(b) by 0 days.

(21) Appl. No.: 12/626,672

(22) Filed: Nov. 26, 2009

(65) Prior Publication Data

US 2010/0072796 A1  Mar. 25, 2010

Related U.S. Application Data

(60) Division of application No. 12/192,122, filed on Aug. 15, 2008, which is a continuation of application No. PCT/JP2007/052816, filed on Feb. 16, 2007, now abandoned.

(30) Foreign Application Priority Data

Feb. 16, 2006  (JP)  .............................. 2006-039639
Feb. 22, 2006  (JP)  .............................. 2006-045011

(51) Int. Cl.
B60N 2/42 (2006.01)
B60N 2/20 (2006.01)
(52) U.S. Cl. ................................ 297/216.13; 297/367 P

(58) Field of Classification Search ................. 297/366, 297/368, 369, 367 R, 367 P, 367 L, 216.1, 297/216.13, 216.14; 16/222, 223
See application file for complete search history.

(56) References Cited

U.S. PATENT DOCUMENTS

| 5,507,553 | A | * | 4/1996 | Nishizawa et al. | ..... 297/216.13 |
| 6,112,370 | A | * | 9/2000 | Blanchard et al. | ............. 16/325 |
| 6,312,053 | B1 | * | 11/2001 | Magyar | .................. 297/367 R |
| 6,328,383 | B2 | * | 12/2001 | Rohee et al. | ............ 297/367 R |
| 7,204,555 | B2 | * | 4/2007 | Thiel | ...................... 297/367 R |
| 7,341,311 | B2 | * | 3/2008 | Ohba | ..................... 297/367 R |

* cited by examiner

*Primary Examiner*—Milton Nelson, Jr.
(74) *Attorney, Agent, or Firm*—Hiroe & Associates; Taras P. Bemko

(57) ABSTRACT

A reclining device capable of eliminating mechanical play in a front-rear direction of a seat back is provided. Particularly, a reclining device reliably capable of locking and releasing is provided at an inexpensive cost. Movable guides are slidably disposed respectively between lock gears and a fixed guide. Each of the movable guides is formed in a shape that the width thereof gradually decreases from the outer end toward the inner end. In the sliding faces of the respective movable guides, a sliding face on the lock gear side is arranged to be parallel to a movement direction of the lock gear and the sliding face at the fixed guide side is inclined with respect to the sliding face at the side of the lock gear. Each of the movable guides engages with a spring and the spring imparts a force to the movable guides in an inner direction of a base plate.

14 Claims, 21 Drawing Sheets

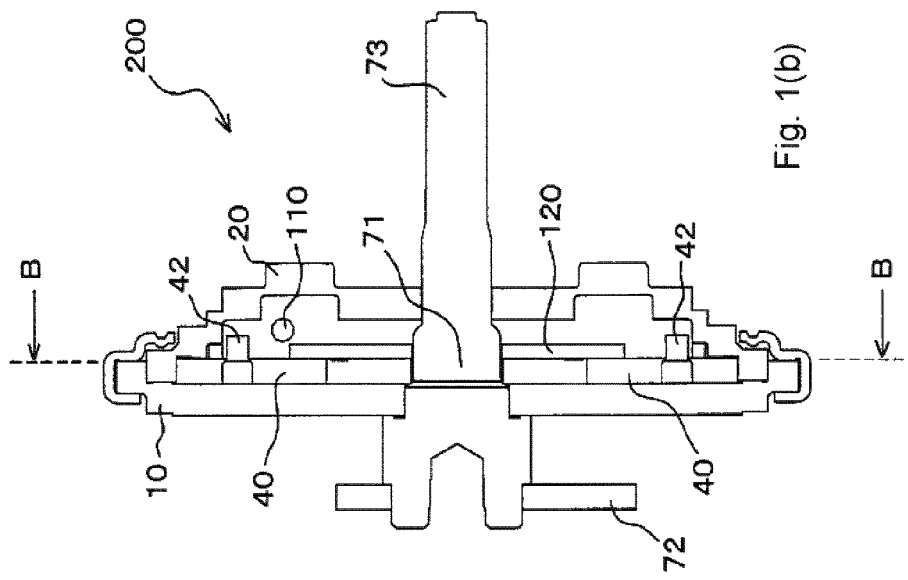
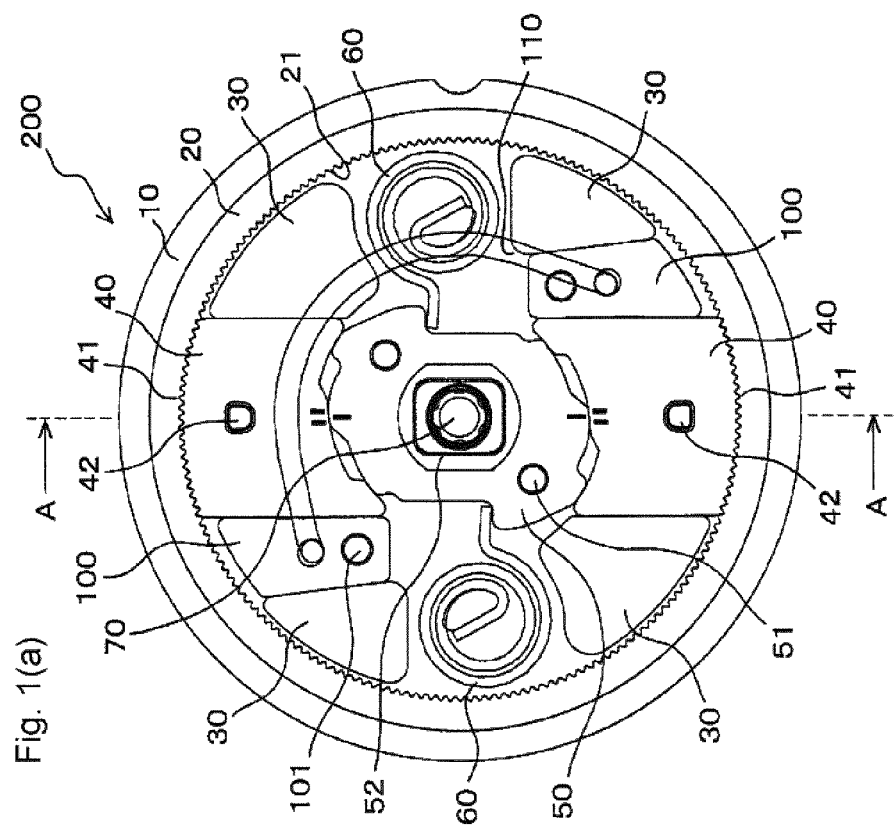
Fig. 1(a)
Fig. 1(b)

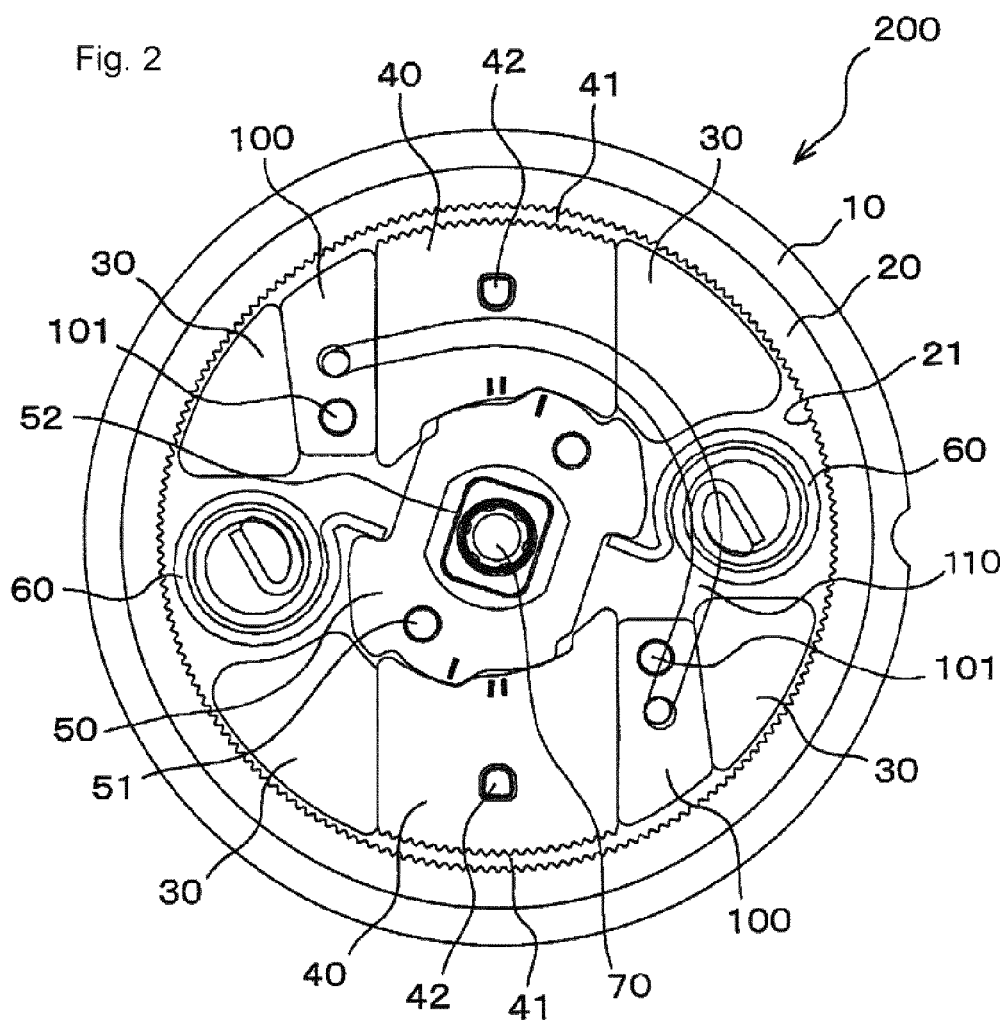

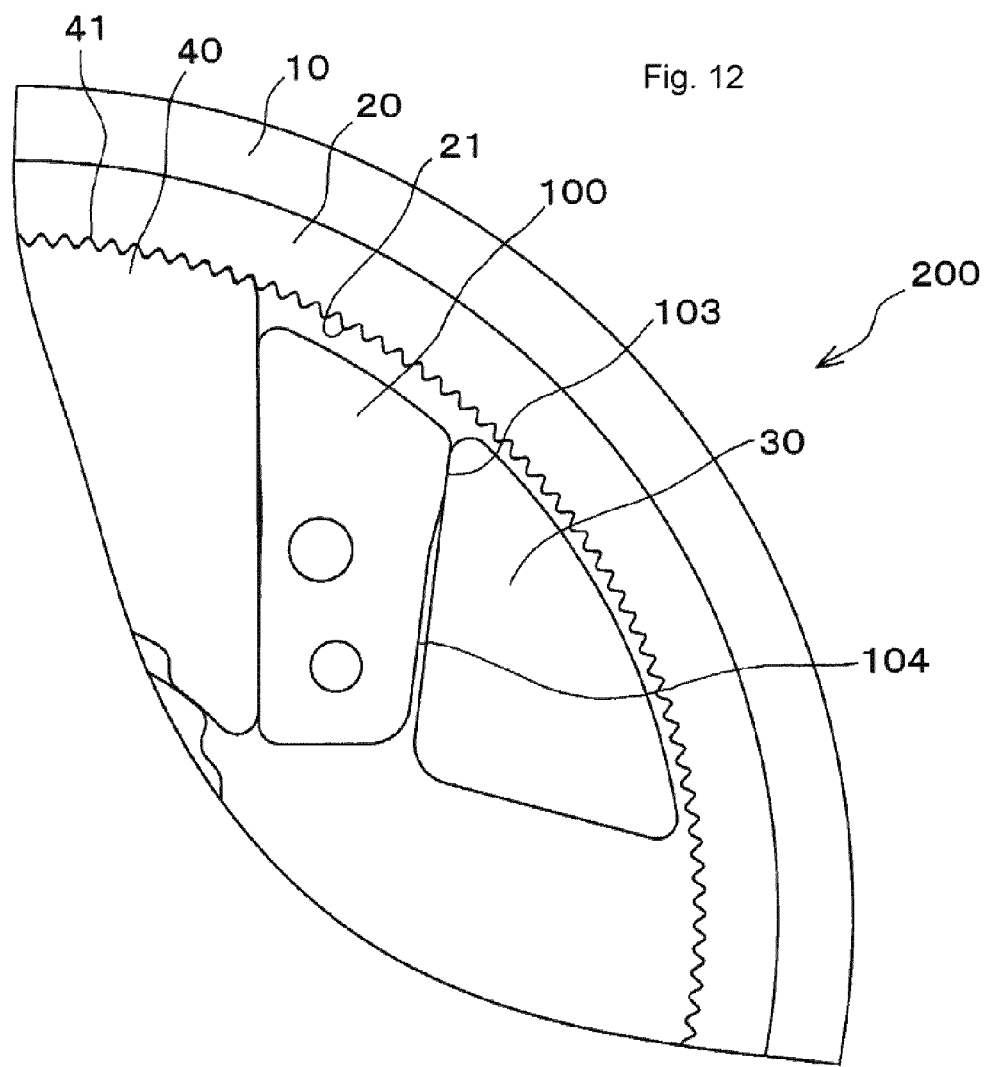

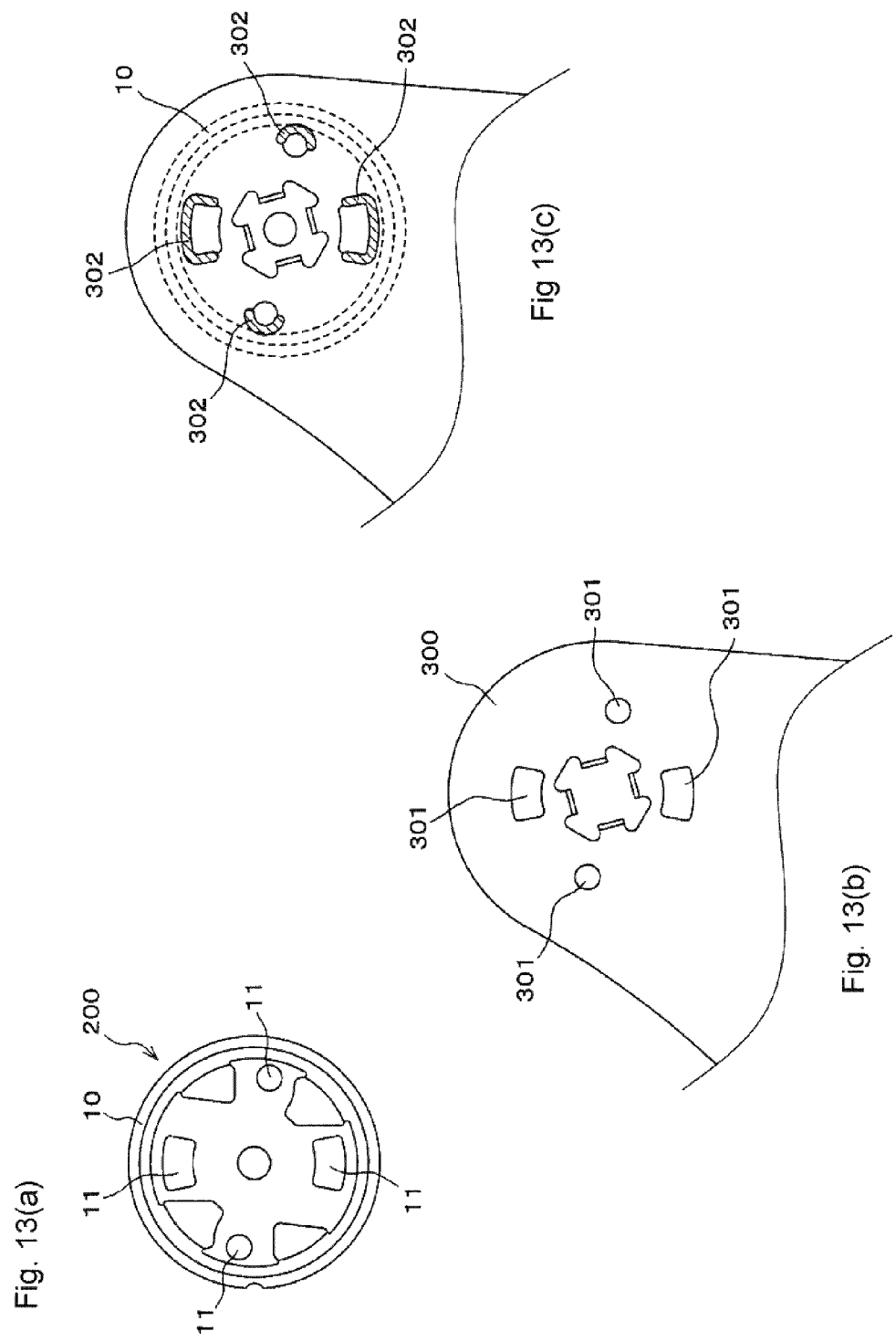

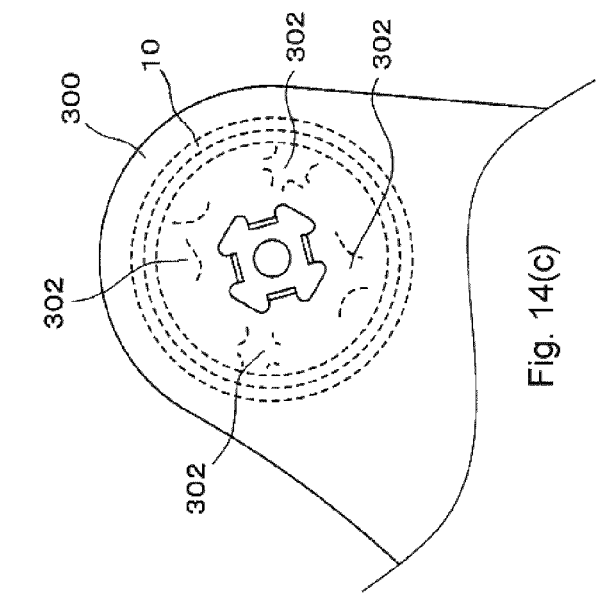
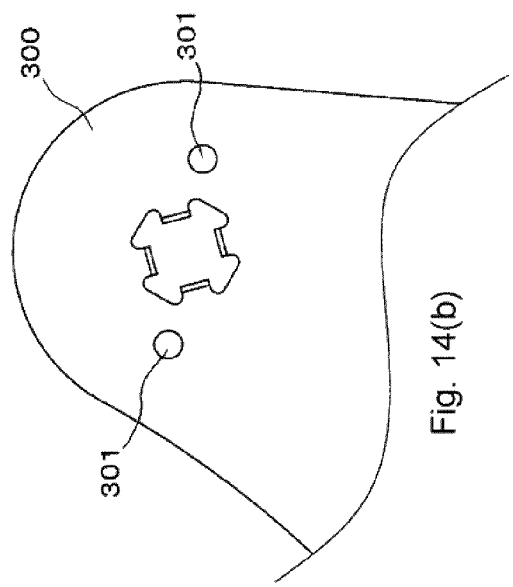
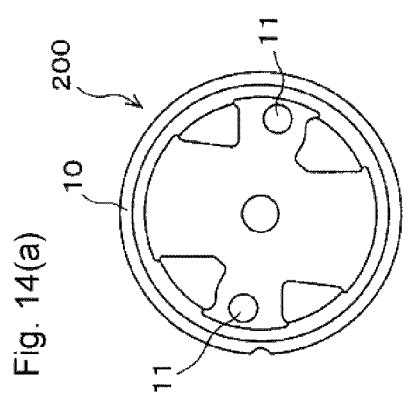

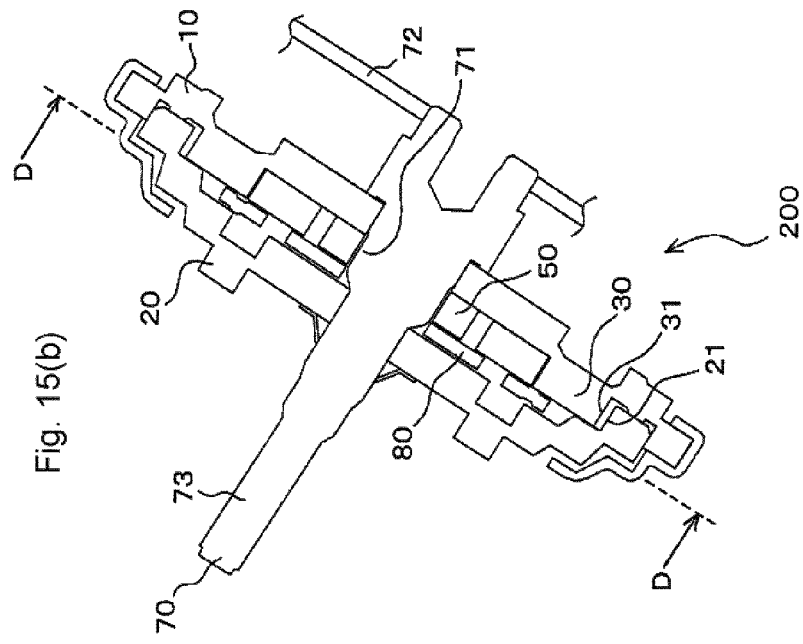
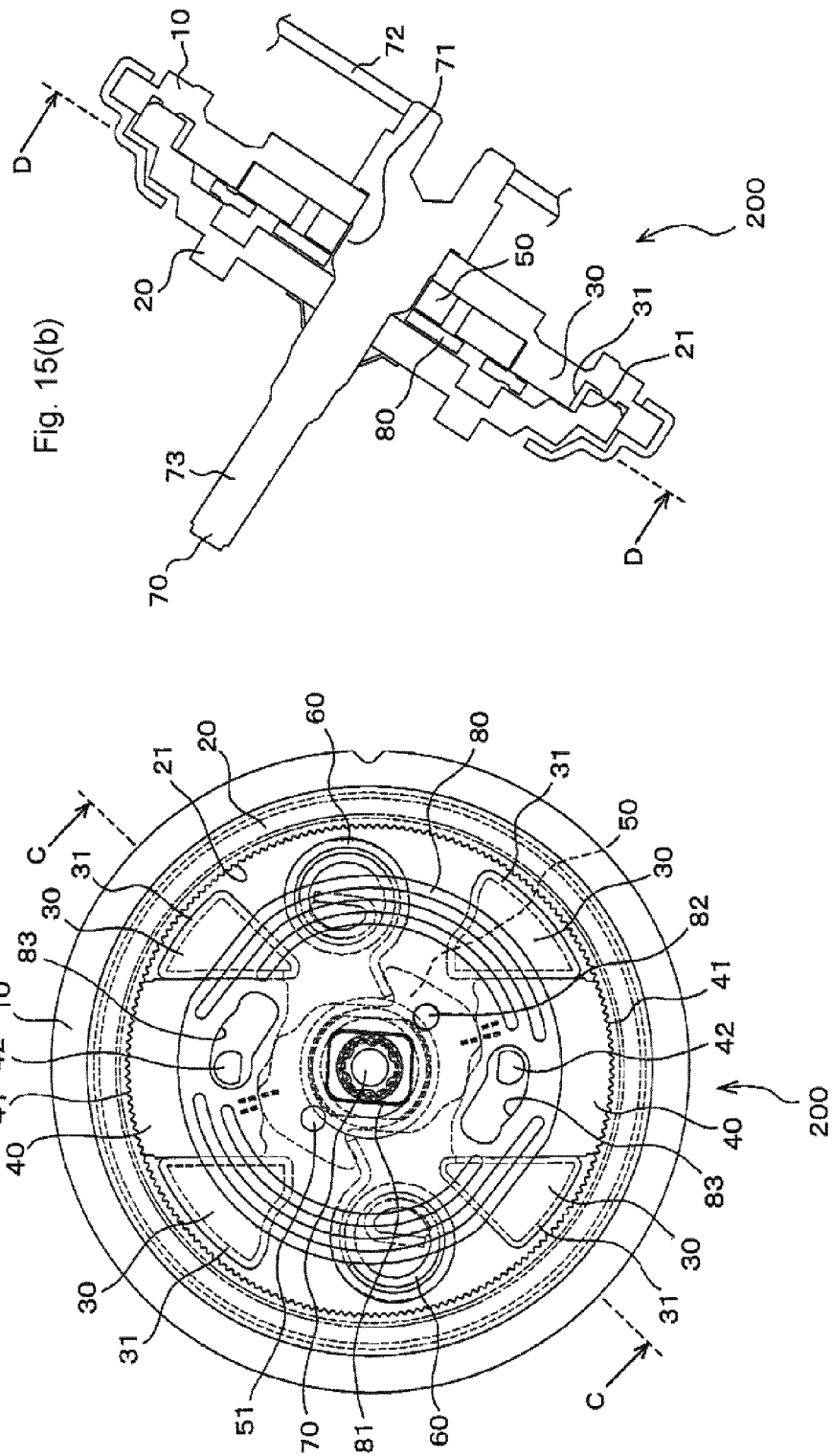
Fig. 15(a)
Fig. 15(b)

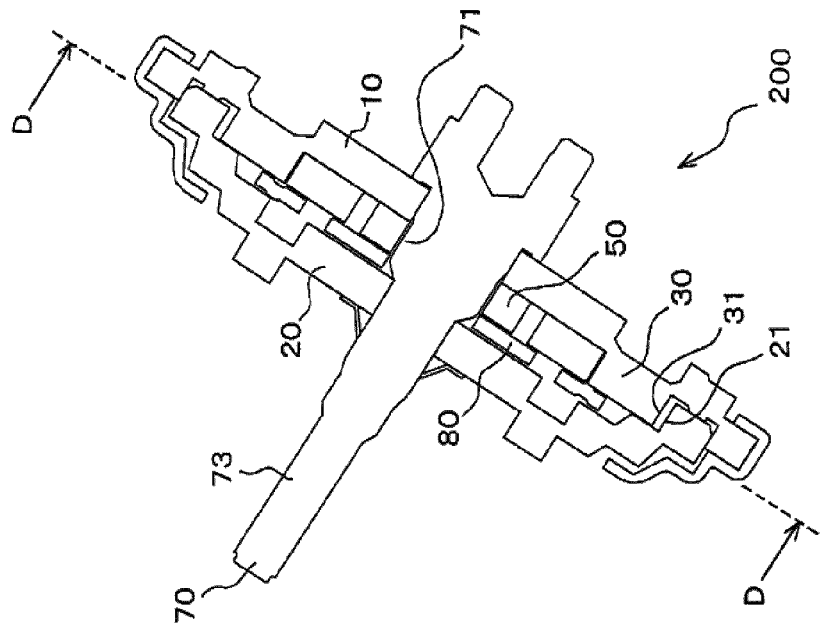
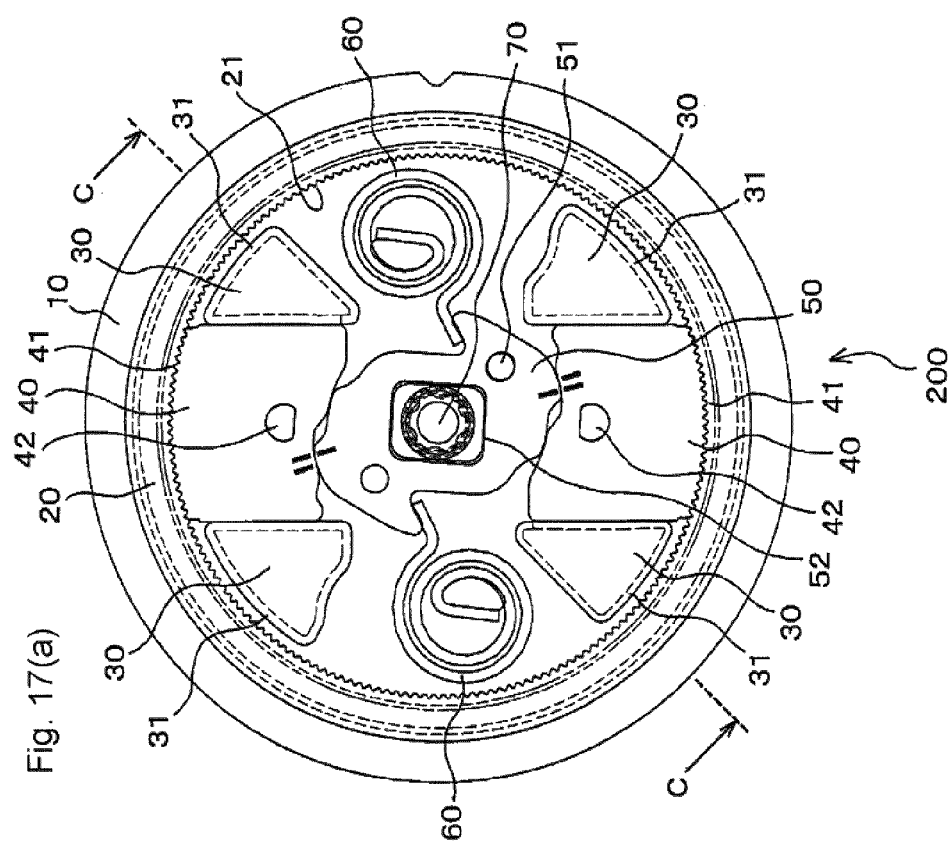

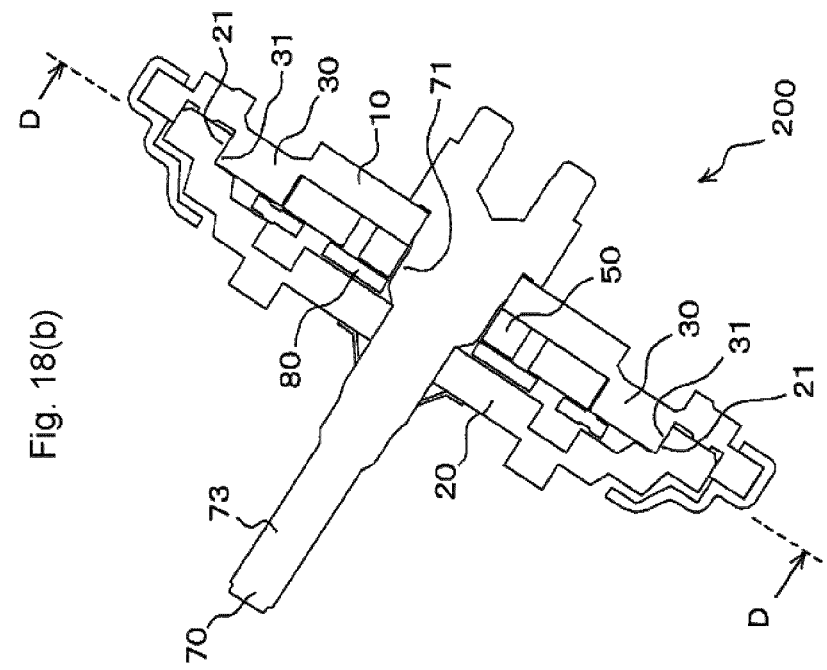
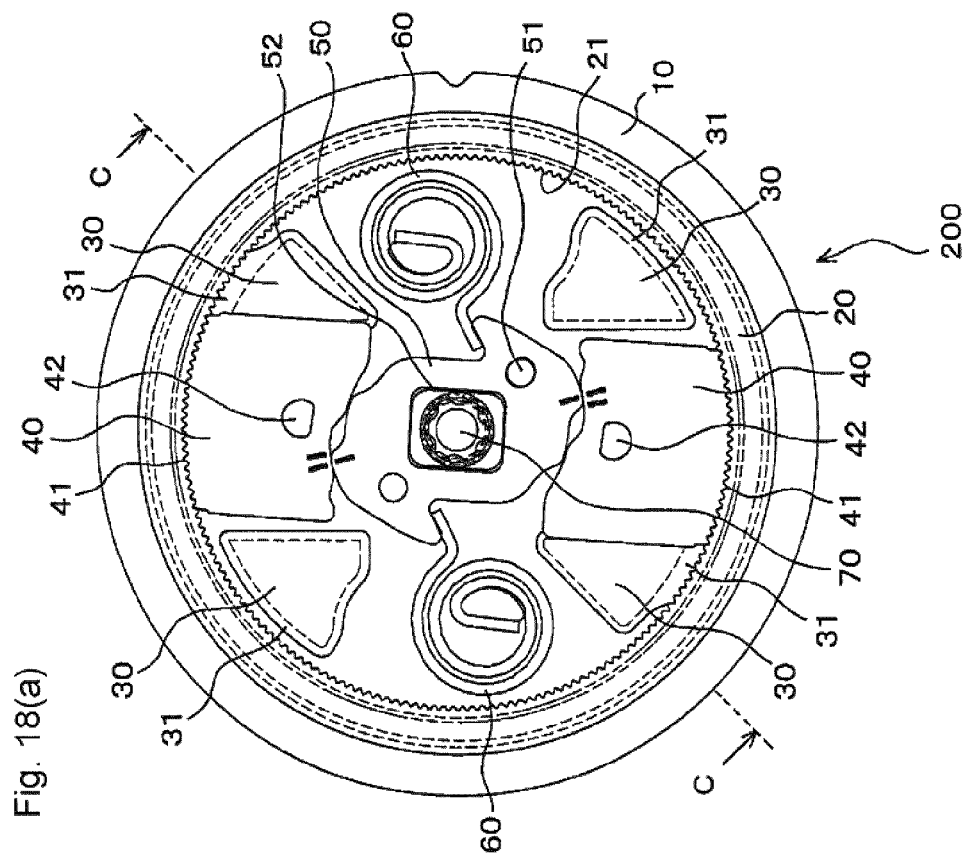
Fig. 18(a)
Fig. 18(b)

RECLINING DEVICE

RELATED APPLICATIONS

This application is a divisional of U.S. patent application Ser. No. 12/192,122 having a filing date of Aug. 15, 2008, having been published on Mar. 12, 2009 as Publication No.: 2009-0066137 A1, and now pending, which is a continuation of International Application PCT/JP2007/052816, with an international filing date of Feb. 16, 2007, now abandoned, which claims priority to Japanese Application JP2006-039639, having a filing date of Feb. 16, 2006, now pending, and Japanese Application JP2006-045011, having a filing date of Feb. 22, 2006, now pending, all of which are hereby incorporated herein by reference.

TECHNICAL FIELD

The present invention relates to a reclining device for vehicle seats, and more particularly to a reclining device that eliminates mechanical play in a front and rear direction of a seat back to prevent unintended inclination movement of the seat back upon a vehicle collision.

BACKGROUND OF THE INVENTION

Vehicle seats are often provided with various kinds of angle and position adjusting mechanisms to adjust the seat to the size and posture of a seated occupant. In such mechanisms, a reclining device, which adjusts the angle of a seat back with respect to a seat cushion, is the most basic seat adjusting mechanism. Therefore, such a reclining device is mounted on most vehicle seats.

There are two types of reclining devices, powered-type reclining devices in which the seat back is operated by the power of an electric motor, and manual-type reclining devices in which a seated occupant operates the seat back manually. Compared to the powered-type reclining devices, the manual-type reclining devices have simpler structures. The risk of failure is smaller and the manufacturing cost is lower in the manual-type reclining devices. Therefore, many vehicles are equipped with manual-type reclining devices these days.

In some manual-type reclining devices, inner teeth are arranged to engage with outer teeth to lock the reclining device. The outer teeth are arranged to be movable toward or away from the inner teeth. When the engagement between the inner teeth and the outer teeth is released, a force imparted by a spring rotates the seat back. Since manual-type reclining devices have an advantage in that the seat back can be inclined swiftly with an easy operation of a lever, manual-type reclining devices are mounted on many vehicles these days.

However, in the manual-type reclining devices, the lock gear that has the outer teeth has to be sandwiched and supported between a pair of guide portions. At the same time, the lock gear has to be allowed to slide between the guide portions. Therefore, a gap is present between the lock gear and the guide portions. When the reclining device is mounted on a vehicle seat, the gap allows mechanical play in a front and rear direction of the seat back. Although such mechanical play does not directly affect the safety of the occupant, it can convey an uncomfortable feeling to the occupant. Conventionally, as a solution to the above problem, a reclining device is disclosed in Japanese Unexamined Patent Application Publication No. 7-12325.

In the reclining device disclosed in that document, a pair of lock gears (support and receiving plates), each of which has a generally triangular shape, is formed. The reclining device includes these two component members, which are slidably coupled to abut on respective inclined faces. The reclining device is arranged so that, when one member is pressed from the rear side by a rotatable cam, outer teeth of the lock gear engage with a row of inner teeth. In the device, an inclined face of one lock gear is pushed out while sliding on the inclined face of the other lock gear. Between guide portions (within a concave portion), the two pieces of the lock gear are pushed so as to be wider and the lock gear (support and receiving plates) is brought into close contact with side faces of the guide portion (concave portion). As a result, a gap between the lock gear and the guide portion is eliminated and the mechanical play in the front and rear direction of the seat back is eliminated. The reclining device disclosed in Japanese Unexamined Patent Application Publication No. 7-12325 is advantageous in this respect.

The reclining device disclosed in Japanese Unexamined Patent Application Publication No. 7-12325, however, employs a structure in which the cam pushes only one of the lock gears to press the other lock gear against the guide. Therefore, there is a problem that, when one lock gear is locked first, the other lock gear may be stopped in an unlocked state.

As a solution to the above problem, a reclining device has been proposed in Japanese Unexamined Patent Application Publication No. 11-155674. The reclining device disclosed in that document is arranged so that a first cam pushes a second cam and a lock gear, and the second cam presses the lock gear onto a guide portion to thereby bring the lock gear into close contact with the guide portion. This arrangement eliminates the gap between the lock gear and the guide, and the mechanical play in the front and rear direction of the seat back is thus eliminated. The reclining device disclosed in Japanese Unexamined Patent Application Publication No. 11-155674 is advantageous in this respect.

However, the reclining device disclosed in Japanese Unexamined Patent Application Publication No. 11-155674 employs a structure in which the first cam pushes the second cam and the lock gear simultaneously. A high precision is thus required of the component members. In particular, when the second cam is formed in a circular shape, such a problem as catching of a component member, which is experienced in the device disclosed in Japanese Unexamined Patent Application Publication No. 7-12325, can be eliminated. However, there is a possibility that such a loss as a useless turning of the second cam may occur.

On the other hand, in the manual-type reclining device, even when the inclination movement of the seat back is locked, the lock gear, which is pushed out by the cam, is just pressed against the inner teeth of the gear plate to thereby maintain the engagement between them. Therefore, when an overload is applied to the reclining device upon a collision of a vehicle equipped with the reclining device, the lock gear disengage from the inner teeth of the gear plate. In this situation, the seat back may be inclined unintentionally. As a solution to the above problem, the applicant for the present invention has proposed a reclining device disclosed in Japanese Unexamined Patent Application Publication No. 2005-230300.

The reclining device disclosed in that document employs the following arrangement. Ordinarily, a movable guide pushes a lock gear. When an overload is applied to the reclining device upon a collision of a vehicle or in an emergency situation, the movable guide comes into contact with the inner teeth of a gear plate and the inner teeth are elastically deformed and engaged with the inner teeth. With this arrangement, in an emergency the movable guide is firmly fixed with the gear plate. As a result, unintended inclination movement of the seat back can be prevented. In this respect the reclining device disclosed in Japanese Unexamined Patent Application Publication No. 2005-230300 is highly advantageous.

In the device disclosed in Japanese Unexamined Patent Application Publication No. 2005-230300, however, the movable guide of the reclining device has to fulfill both of the following requirements. During ordinary operation the movable guide has to hold the lock gear without a gap, and in an emergency the movable guide has to engage with the gear plate. High precision is thus required in machining and assembling the component parts that constitute the reclining device. This can be burdensome in terms of manufacturing cost and manufacturing efficiency.

BACKGROUND OF THE INVENTION

The present invention has been proposed in view of the above problems. Embodiments of the invention may exhibit certain advantages in comparison with prior art devices.

An embodiment of the invention may provide a reclining device capable of eliminating mechanical play in a front and rear direction in a seat back during normal operation. The reclining device may perform reliable locking and releasing at a low cost.

An embodiment of the invention may provide a low cost reclining device that can prevent unintended inclination movement of the seat back in an emergency such as a vehicle collision or the like, with a simple structure.

In order to solve the above problems, embodiments of the invention may employ various structures.

The invention may be embodied in a reclining device that includes a base plate fixed to either of a seat cushion or a seat back, and a gear plate with inner teeth that is rotatably assembled with the base plate and fixed to the other of the seat cushion or the seat back. Two pairs of fixed guides may be formed on the base plate. One of two lock gears, each of which has outer teeth that are capable of being engaged with the inner teeth of the gear plate, may be located between each pair of fixed guides so that the lock gears can slide along one of the fixed guides. The device may include a cam that controls the movement of the pair of lock gears to engage the lock gears with the inner teeth of the gear plate. Springs can be provided to impart a rotational force to the cam to keep the lock gears engaged with the inner teeth of the gear plate. A center shaft 70 can be configured to drive the cam to rotate and hereby to disengage the pair of lock gears from the gear plate. A movable guide can be slidably disposed between each of the lock gears and the corresponding pairs of fixed guides. Each of the movable guides can be formed in a shape the width of which gradually decreases from the outer end toward the inner end, with the pair of movable guides being provided with a spring that imparts a force to the pair of movable guides toward an inner direction of the base plate.

In some embodiments each of the movable guides may be formed in a shape the width of which gradually decreases from the outer end toward the inner end, and arranged so that a sliding face at the side of the lock gear is parallel to a movement direction of the lock gear and so that a sliding face nearer the fixed guide is inclined with respect to the sliding face nearer the lock gear.

In some embodiments each of the lock gears may be formed with a width that gradually decreases from the inner end toward the outer end. The sliding face of the lock gear near the fixed guide can be parallel to a movement direction of the lock gear. The movable guide can be formed so that its width gradually decreases from the outer end toward the inner end, and be arranged so that the sliding face near the lock gear is inclined with respect to a movement direction of the lock gear, and so that a sliding face near the fixed guide is inclined with respect to the sliding face near the lock gear.

In some embodiments the spring attached to the movable guides may be a torsion spring that pulls the movable guides at the both ends of the spring toward one another.

Some embodiments may include a pair of torsion springs that impart a rotational force to the cam, in which each of the torsion springs imparts a force to pull the cam and the movable guide attached to that spring together along a diagonal line.

In some embodiments each of the movable guides can be provided with outer teeth capable of being engaged with the inner teeth of the gear plate at the outer end of the movable guides.

In some embodiments each of the movable guides can be formed with a contact portion that comes into close contact with one of the fixed guides at the outer end portion of the sliding face of the fixed guide. A step portion can be included at the contact portion to insure a gap between the fixed guide and the movable guide.

Some embodiments may include a link plate that rotates along with the cam to push the movable guides outward when the cam is rotated, thereby to disengage the lock gears from the inner teeth of the gear plate.

The base plate can be laser-welded to a seat cushion bracket or a seat back bracket that forms a part of a seat frame of a vehicle seat.

A base plate can be fixed to either of a seat cushion or a seat back. A gear plate with inner teeth can be rotatably assembled with the base plate and fixed to the other of the seat cushion or the seat back. Two pairs of fixed guides can be formed on the base plate. Lock gears, each of which has outer teeth capable of being engaged with the inner teeth of the gear plate, can be disposed between the pairs of fixed guides so that the lock gears slide along the fixed guides. A cam can be included to control the movement of the lock gears to engage the lock gears with the inner teeth of the gear plate. A pair of springs can be configured to impart a rotational force to the cam to keep the lock gears engaged with the inner teeth of the gear plate. A center shaft can drive the cam to rotate to disengage the pair of lock gears from the gear plate. The mechanical strength of the fixed guides can be made lower than the strengths of the gear plate and the lock gears so that, when a large load is applied to the reclining device, the lock gears push the fixed guides to deform the fixed guides and cause the outer end portion of the fixed guides to come into contact with the inner teeth of the gear plate to thereby prevent the inclination movement of the seat back.

The fixed guides can be located so that the outer end portions of the fixed guides are positioned close to the front ends of the inner teeth of the gear plate, so that when the fixed guides are deformed, their outer end portions bite into the inner teeth of the gear plate.

The fixed guides can have a thickness such that, when the base plate and the gear plate are assembled with each other, the fixed guides come into substantially close contact with the gear plate, and such that when the fixed guides are deformed, the gear plate restricts the deformation of the fixed guides.

Some embodiments can include a link plate that rotates along with the cam to pull the lock gears inward when the cam is rotated to disengage the lock gears from the inner teeth of the gear plate. The link plate can include a cut-off in an outer periphery at a point where, when the lock gears are engaged with the inner teeth of the gear plate, the lock gears come into contact with the outer end portion of the fixed guides at the outer periphery of the link plate, and when the fixed guides are deformed, the deformation is released from the cut-off of the link plate to allow the link plate to come into contact with the gear plate.

Embodiments of the invention may exhibit the following advantageous effects.

The reclining device can be provided with a pair of movable guides. Each of the movable guides can have a wedge-like shape the width of which gradually decreases from the outer end toward the inner end. Each of the movable guides can be disposed between the lock gear and the fixed guide. Each of the movable guides can be imparted with a force toward an inner direction of the base plate by a spring. So configured, each of the movable guides is sandwiched between the lock gear and the fixed guide 30. The fixed guide, the lock gear, and the movable guide are then maintained in close contact with one another with no gap between them. Consequently, mechanical play in the front and rear direction of the seat back can be reliably eliminated, and the lock gear and the movable guide can be reliably locked with and released from each other.

In some embodiments, each of the movable guides is arranged so that the sliding face near the lock gear is parallel to a movement direction of the lock gear. This can prevent the movable guide from catching against the lock gear. Mechanical play in a front and rear direction of the seat back can also be eliminated, and the movable guides can be reliably locked and unlocked.

The lock gears can be formed so that their width gradually decreases from their inner ends toward their outer ends. The sliding face of each of the lock gears near its fixed guide can be parallel to the lock gear's direction of movement. The lock gear is thereby formed with an inclined surface near the movable guide. The movable guide, which has a wedge-like shape, is disposed between the inclined surface and the fixed guide. The sliding faces are held in a close contact with each other, and the outer teeth of the lock gear engage with the inner teeth of the gear plate. The rotation of the gear plate is thereby locked, and the seat is thus not allowed to recline. To unlock the seat and allow it to recline, the center shaft is rotated to disengage the outer teeth of the lock gears from the inner teeth of the gear plate. The contact face between the lock gear and the movable guide is inclined with respect to a movement direction of the lock gear. When the lock gear is pulled in an inner direction, the lock gear and the movable guide can be separated with very little friction generated between them. The lock gear can thereby be pulled inward smoothly and without significantly pushing out the movable guide with the link plate, and the lock can thus be released. The reclining device can be constructed from only a few component parts.

In some embodiments the movable guides are attached to the respective ends of a torsion spring. The base plate will in that case not require any engagement portions for the spring, and the number of component parts can be reduced and the structure of the device simplified. This facilitates the assembly of the reclining device, which can reduce its cost of manufacture and enhance its durability.

In some embodiments, each of the two torsion springs is attached to a cam at one end of the spring and to one of the movable guides at the other. This configuration pulls the movable guides along a diagonal line. Inward forces are thereby imparted to the movable guides, with a rotational force imparted uniformly to the cam from two directions. The cam is thus not imparted with a force in an eccentric direction. The cam is rotated at the center of the base plate, because the pushing force of the cam 50 is applied uniformly to both of the lock gears. The outer teeth of the lock gears engage with the inner teeth of the gear plate, and locking is reliably achieved.

In some embodiments each of the movable guides will have outer teeth at the outer end of the guide. When an overload is applied to the reclining device during a vehicle collision or the like, a rotational load is transmitted from the gear plate to the lock gears. The lock gears then push the movable guides between the fixed guides. Each of the movable guides is formed with a width that gradually decreases from the outer end toward the inner end. Each of the movable guides is pushed outwardly along the base plate. The outer teeth at the outer end of the movable guides move toward the inner teeth of the gear plate and are engaged with them. The movable guides and the lock gears thereby prevent the gear plate from rotating. When an overload is applied to the reclining device during a vehicle collision or the like, the movable guides and the lock gears thereby prevent rotation of the gear plate, and unintended inclination of the seat back is prevented in the collision.

A gentle two-step shape that includes a contact portion and a step portion can be formed on the movable guide near the fixed guide. The movable guide is thus in close contact with the fixed guide only at the contact portion. Consequently, even when there is some small variance in the manufacturing dimension of the fixed guide, the movable guide naturally comes into close contact with the fixed guide at its outer end. Mechanical play in the front and rear direction of the seat back can thus be prevented.

When the cam is rotated to release the lock, a link plate that rotates along with the cam pushes the movable guides outward. When movable guides with a wedge-like shape, which are in a close contact with the fixed guides and the lock gear, are pushed outward, a gap opens between the movable guide and the lock gear. This allows the lock gear to slide, thereby releasing the lock reliably.

The base plate can be laser-welded to a seat cushion bracket or a seat back bracket that forms a part of the seat frame. Emboss processing points for welding on the base plate can be reduced, and it is not required to form a large opening in the bracket. Plastic processing on the component parts can thereby be minimized, and a high-strength vehicle seat provided.

In some embodiments, the mechanical strength of the fixed guides formed integrally with the base plate 10 can be made less than that of the gear plate and the lock gears. Therefore, when an overload is applied to the reclining device upon a vehicle collision or the like, the lock gears will push and deform the fixed guides. The outer end portions of the fixed guides will thus be brought into contact with the inner teeth of the gear plate 20. This will fix the gear plate in place and prevent the seat back from inclining. Therefore, even in a collision or another emergency, unintended inclination of the seat back can be prevented. Since, moreover, the fixed guides are formed integrally with the base plate, the number of component parts can be reduced and the structure simplified, which makes assembling the device easier. The devices' manufacturing cost can thus be reduced and its durability increased.

In some embodiment, the outer end portions of the fixed guides and the front ends of the inner teeth 21 of the gear plate are located as close to each other as possible. Even a small deformation of the fixed guide can thus cause force the outer end portion of the fixed guide into contact with the inner teeth of the gear plate, thereby preventing unintended inclination of the seat back.

In some embodiments, the fixed guides have a thickness that brings them into close contact with the gear plate when the base plate and the gear plate are assembled. The gaps between the base plate and the gear plate in the direction of the shaft axle is thus made as small as possible. Therefore, when the fixed guides are deformed, the gear plate restricts this deformation in the direction of the gear plate's thickness. Nearly all of the deformation of the fixed guide can be utilized to bring the fixed guide into contact with the inner teeth of the gear plate. Consequently, unintended inclination of the seat back can be more reliably prevented.

The link plate of the reclining device can have a cut-off at the peripheral end of the link plate. When an overload is applied to the reclining device in a collision of a vehicle or the like, a part of the deformed lock gear runs out from the cut-off to engage with the gear plate. The movement direction of the material of the deformed fixed gears can thus be controlled as desired, and the fixed guides thereby engaged with the gear plate more effectively.

BRIEF DESCRIPTION OF THE DRAWINGS

Reclining devices that embody the invention will be described below with in connection with the appended drawings, in which:

FIG. 1(a) is a sectional view of a reclining device according to a first embodiment, taken along section line B-B in FIG. 1(b);

FIG. 1(b) is a sectional view taken along section line A-A in FIG. 1(a); state;

FIG. 2 illustrates the reclining device of FIG. 1(a) in an unlocked state;

FIG. 12 illustrates a reclining device according to a sixth embodiment, the enlarged vicinity of a movable guide;

FIGS. 13(a)-13C illustrate a part of a bracket that forms a part of a vehicle seat frame and a reclining device according to a seventh embodiment, in which both members are arc-welded together so as not be separated from each other;

FIGS. 14(a)-14(c) illustrate a part of a bracket that forms a part of a vehicle seat frame and the reclining device in the seventh embodiment, in which both members are arc-welded together so as not be separated from each other;

FIG. 15A is a sectional view taken along section line D-D in FIG. 18B, showing a state of the reclining device according to an eighth embodiment, which is locked against reclining;

FIG. 15B is a sectional view taken along section line C-C in FIG. 18A;

FIGS. 17A and 17B illustrate the reclining device shown in FIGS. 15A and 15b, with the link plate 80 removed from the device;

FIGS. 18A and 18B illustrate the reclining device of FIGS. 17A and 17B, showing an emergency state in which an overload is applied to the reclining device and in which the fixed guides are plastically deformed so that the outer end portions of the fixed guides are engaged with inner teeth of a gear plate;

DETAILED DESCRIPTION OF PREFERRED EMBODIMENTS

Embodiment 1

Figure 3:
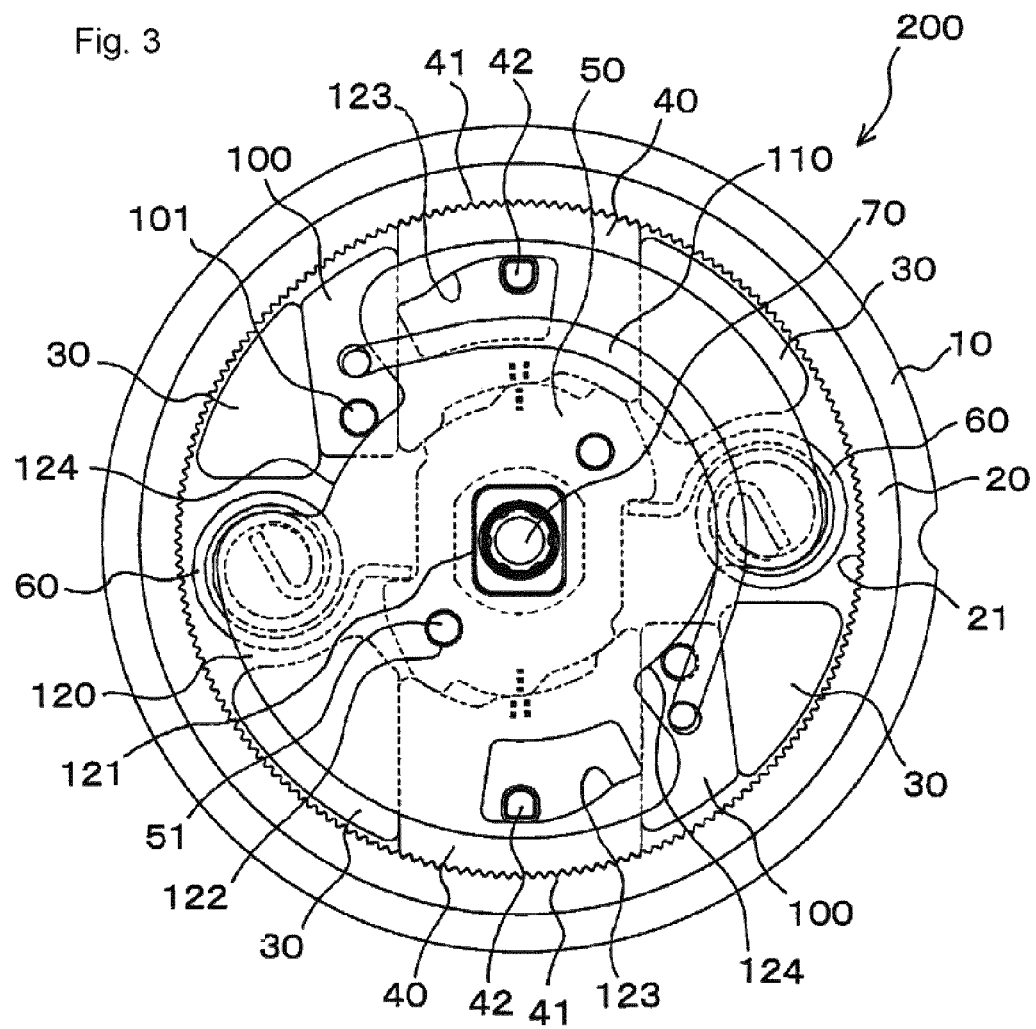
FIG. 3 illustrates the reclining device of FIG. 1(a) including a link plate.

FIGS. 1(a), 1(b), 2, 3, and 4 illustrate a reclining device 200 according to a first embodiment. The reclining device 200 includes a base plate 10, a gear plate 20, fixed guides 30, lock gears 40, a cam 50, springs 60, a center shaft 70, movable guides 100, a spring 110, and a link plate 120. These components are described in more detail below.

The base plate 10 is a base of the reclining device 200. The base plate 10 is fixed to either of a seat cushion or a seat back of a vehicle seat. The base plate 10 has to be strong enough to support a load of the seat back and the weight of an occupant. Therefore, the base plate 10 is formed of steel plate and processed by press working or cutting. In the first embodiment, the base plate 10 is has a circular exterior shape formed by press working a steel plate. The base plate 10 is also formed with fixed guides 30. The fixed guides 30 are fixed to the seat cushion.

The gear plate 20 is assembled with the base plate 10 with the base plate 10 rotatable with respect to the gear plate 20. The gear plate 20 fixed to the other of the seat cushion and the seat back of the vehicle seat (i.e., to the opposite seat element of the one fixed to the base plate 10). The gear plate 20 has inner teeth 21 on its inner periphery at side of the gear plate opposite to the face fixed to the seat back or the seat cushion. The inner teeth 21 are engageable with outer teeth 41 on the lock gears 40. When these are engaged with the lock gear 40, the seat back is locked and prevented from inclining in a front and rear direction. The gear plate 20 has to be strong enough to support the load of the seat back and the weight of an occupant. Therefore, the gear plate 20 is formed from a steel plate by press-working or cutting. In this embodiment, the gear plate 20 is formed from a steel plate with circular exterior by press working and provided with inner teeth 21. The gear plate 20 is fixed to the seat back.

The base plate 10 includes two pairs of integrally-formed fixed guides 30. Each pair of fixed guides 30 is located eccentrically at two points to sandwich and hold one of the lock gears 40 and a movable guide 100. Since the load of the seat back and the weight of an occupant are imposed on the fixed guides 30, the fixed guides 30 have to be strong enough to support this load. Therefore, the fixed guides 30 are formed of a sheet of steel plate by press-working or cutting. In this first embodiment, the fixed guides 30 are formed by pressing a sheet of steel plate to protrude the fixed guides from the plate using a die from the rear side of the plate at the same time as the base plate 10 is formed by press working the steel plate sheet.

The side faces of the lock gears 40 are formed parallel to one another so that the lock gears 40 can slide between the fixed guides 30. Each of the lock gears 40 is formed with outer teeth 41 on an edge that connects the side faces of the lock gear so that these outer teeth 41 can engage with the inner teeth 21 of the gear plate 20. When the outer teeth 41 of the lock gear 40 engage with the inner teeth 21 of the gear plate 20, primarily the outer teeth 41 bear the load from the gear plate 20. Therefore, the lock gears 40 have to be strong enough to bear this load. Accordingly, the lock gears 40 are formed from a sheet of steel plate by press-working or cutting to form a base metal. After that, quench hardening or forging is performed on the base metal. In the first embodiment, the lock gears 40 are formed by press-working a sheet of steel plate and then quench hardening the gears. Further, each of the lock gears 40 is formed with a projection 42 to which a link plate 120 can be connected. Furthermore, although it is not depicted clearly in the figures, each of the lock gears 40 is formed so that a central area of its sliding face is concave on both sides of the gear. That is, the central area is formed in a concave shape on both sides (refer to FIG. 4). Therefore, the lock gear 40 comes into contact with the fixed guide 30 or the movable guide 100 at two points near an outer end portion and an inner end portion (with reference to the base plate). This configuration allows the lock gears 40 to slide easier in comparison with a case in which the respective component elements are formed completely straight and brought into contact with each other along planar surfaces.

The cam 50 is located at a substantially central position of the base plate 10, with the shaft 70 inserted through the cam. The cam 50 rotates integrally with the shaft 70 to control the sliding movements of the lock gears 40. That is, the rotation of the cam 50 controls the lock gears 40 to engage and release the lock gears with the gear plate 20. Accordingly, rotation of the cam 50 locks and releases inclination of the seat back mounted with the reclining device 200 in a front and rear direction. In this embodiment, the cam 50 has a rectangular hole 52, through which a rectangular-shaped portion 71 of the center shaft 70 is inserted. The cam 50 also has two projections 51, which permit the link plate 120 to be connected to the cam.

The springs 60 impart rotational forces to the cam 50 to keep the lock gear 40 engaged with the inner teeth 21 of the gear plate 20. In this embodiment, the springs 60 are spiral springs. One end of each spring 60 is engaged with the cam 50, with the other end of the spring engaged with an engagement projection on the base plate 10. The invention is not limited to the arrangement described above. The device may be configured, for example, so that a spring (not shown) on the center shaft 70 may impart a rotational force to the cam.

Each of the base plate 10 and the gear plate 20 has a through hole in its central area. The center shaft 70 is inserted through these holes to pivot the base plate 10 and the gear plate 20 coaxially. The center shaft 70 is provided with an operation lever 72, a member separate from the center shaft 70. The cam 50 and the link plate 120 are located between the base plate 10 and the gear plate 20 with the center shaft 70 inserted through them. When an occupant manually operates the operation lever 72, the cam 50 and the link plate 120 are rotated together to engage or disengage the lock gear 40 and the gear plate 20. In this embodiment, the center shaft 70 is cut from a steel material. To be more precise, a rectangular-shaped portion 71 is formed at a generally central area in a longitudinal direction of the center shaft 70. The rectangular-shaped portion 71 is inserted into rectangular holes 121 in the cam 50 and the link plate 120. One end of the center shaft 70 is configured so that the operation lever 72 can be attached to it. The other end of the center shaft 70 has a splined portion 73 that allows a link shaft (not shown) to be connected to it. The reclining device 200 is mounted to the vehicle seat by means of a pair of joint portions located at the right and left sides of the seat. Therefore, the rotation of the right and left cams 50 of the reclining device 200, which are located at the right and left sides of the seat, have to be synchronized via the link shaft.

Each of the movable guides 100 is formed in a wedge shape so that the width of the guide gradually from one end to the other. Each of the movable guides 100 slides between its corresponding lock gear 40 and its fixed guide 30. The pair of movable guides 100 is engaged with a spring that will be described in more detail below. The spring imparts a force to the pair of movable guides 100 in an inner direction of the base plate 10. With this arrangement, each of the movable guides 100 is constantly positioned between the corresponding lock gear 40 and fixed guide 30. The fixed guide 30, the lock gear 40, and the movable guide 100 are thus kept in close contact with each other, and gaps between them are eliminated. As a result, mechanical play of the seat back in a front and rear direction is eliminated. Also, the movable guide 100 is disposed so that the sliding face at the side of the lock gear 40 is parallel to a movement direction of the lock gear 40. Therefore, the lock gear 40 is prevented catching against the movable guide 100. In this embodiment, each of the movable guides 100 is formed from a steel plate, pressed into a wedge-shape, and hardened by quenching. Further, each of the movable guides 100 is formed with a projection 101 for connection to the link plate 120, as will be described later. Although not illustrated clearly in the figures, the movable guide 100 is formed with concave portions at both sides in the central area of the sliding face. That is, each of the movable guides 100 is formed with a concave shape in the central area on both of its sides (refer to FIG. 4). Therefore, the movable guide 100 abuts on the fixed guide 30 or the lock gear 40 at two points at an outer edge and an inner edge of the guide (with reference to the base plate). Compared to a case in which the component elements are formed planar and brought into a close contact with each other, this arrangement facilitates sliding of the movable guides 100.

The spring is engaged with the movable guides 100, each of which is interposed between one of the fixed guides 30 and one of the lock gears 40. The spring imparts a force to the movable guides 100 toward the inner side of the base plate 10. In this embodiment, the spring is a torsion spring 110 in the form of an arc-shaped rod member. Each of the movable guides 100 is engaged with the torsion spring 110, each end portion of which is bent to form an engagement portion. The torsion spring 110 imparts a force that pulls the movable guides 100 toward each other. The invention is not limited to the above-described arrangement. It may be arranged so that the base plate 10 is formed with engagement portions (not shown), and each of the movable guides 100 is imparted with a force by a separate spring.

When the cam 50 rotates and the engagement of the lock gear 40 with the inner teeth 21 of the gear plate 20 is released, (more preferably, prior to the time at which engagement of the lock gear 40 with the inner teeth 21 of the gear plate 20 is released), the link plate 120 rotates along with the cam 50 to push the movable guides 100 outward. According to the invention, in order to eliminate a gap between the fixed guide 30 and the lock gear 40, which causes mechanical play, each of the movable guides 100 is interposed between the fixed guide 30 and the lock gear 40 to keep them in close contact. In such a state, there may be a case in which the lock gear 40 sticks between the fixed guide 30 and the movable guide 100. In that case, the engagement between the lock gear 40 and the gear plate 20 may not be released simply by rotating the cam 50 to release the seat back lock that restrains its inclination. Therefore, the movable guides 100 are pushed outward to release the close contact between the movable guides 100 and the lock gears 40 before the lock gears 40 are pulled inward of the base plate 10 so as to permit the lock gears 40 to swing freely. In this first embodiment, the link plate 120 is a thin circular plate. A rectangular hole 121 is formed in a central position of the link plate 120 to permit the rectangular-shaped portion 71 to be inserted through the hole. The link plate 120 has round holes 122 to allow the projections 51 of the cam 50 to be inserted through the holes. The link plate 120 also has generally sector-shaped holes 123 that receive the projections 42 of the lock gears 40. The link plate 120 also has concave portions 124 on which projections 101 of the movable guides 100 abut at two points in the circular-shaped outer periphery. The link plate 120 is arranged so that when the link plate 120 is rotated the outer edges of the concave portions 124 come into contact with the projections 101 of the movable guides 100 before the outer edges of the generally sector-shaped holes 123 come into contact with the projections 42 of the lock gears 40. With this arrangement, when the center shaft 70 is rotated to release the lock of the reclining device 200, the concave portions 124 of the link plate 120 first push the projections 101 of the movable guides 100 outward. After that, the generally sector-shaped holes 123 of the link plate 120 allow the lock gears 40 to enter smoothly, and the load on the respective component members can thereby be reduced.

Operation of the reclining device 200 according to the first embodiment, which is arranged as described above, will now be described with reference to FIG. 1(a)-FIG. 4.

In the reclining device 200 according to the first embodiment, when the seat back is locked to restrain inclination in the front and rear direction, an occupant releases the operation lever 72. When the operation lever 72 is released the cam 50, to which a force is imparted in a counterclockwise direction in the figures by the springs 60, rotates as illustrated in FIG. 1(a) and FIG. 3. The lock gears 40 are pushed outward to slide along the fixed guides 30 in the base plate 10, and the outer teeth 41 of the lock gears 40 engage with the inner teeth 21 on the inner periphery of the gear plate 20. The seat back is thus locked and inclination in the front and rear direction is restrained. At this time, the movable guides 100 are inserted firmly between the lock gears 40 and the fixed guides 30, with a force supplied by the spring 110. The fixed guide 30, the lock gear 40, and the movable guide 100 thereby come into close contact with each other with gaps between the respective component members eliminated. As a result, when the seat back is locked and inclination is restrained, mechanical play in the front and rear direction is prevented.

Figure 4:
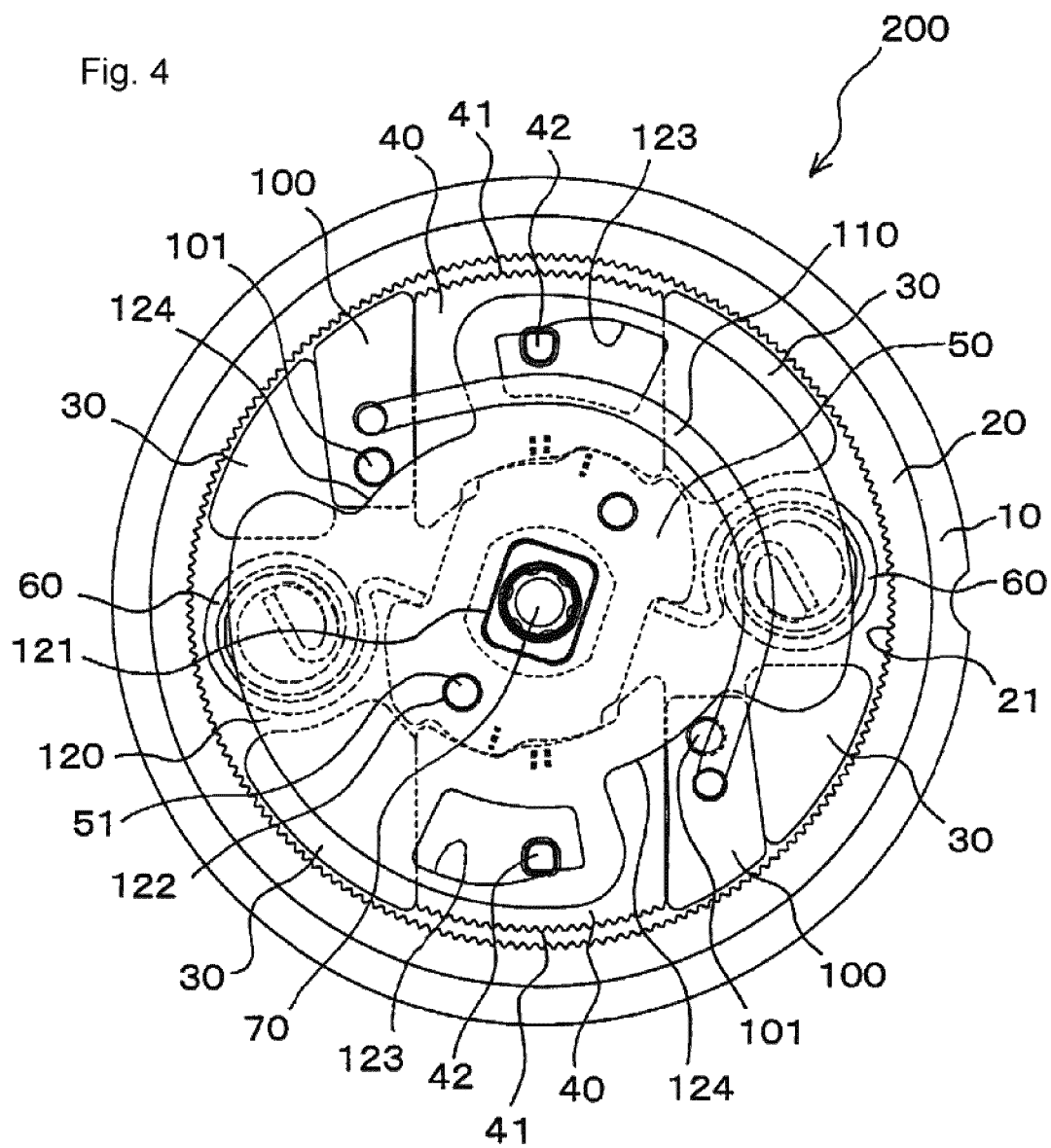
FIG. 4 illustrates the reclining device shown in FIG. 3, in which the lock is released.

To unlock the device to allow the seat back to move in the forward and reverse direction, the occupant pulls up or pushes down the operation lever 72. When the operation lever 72 is rotated the center shaft 70 to which the operation lever 72 is attached rotates along with it. The cam 50 and the link plate 120, through which the center shaft 70 is inserted as illustrated in FIG. 2 and FIG. 4, also rotate simultaneously. When the cam 50 rotates, a gap opens between the cam 50 and the lock gear 40. When the link plate 120 rotates the outer edges of the concave portions 124 of the link plate 120 come into contact with the projections 101 on the movable guides 100 to push the movable guides 100 outward in the base plate 10. The close contact among the movable guides 100, the fixed guides 30, and the lock gears 40 is thereby released. After that, the outer edges of the generally sector-shaped holes 123 of the link plate 120 come into contact with the projections 42 of the lock gears 40. As a result, the lock gears 40 are pulled smoothly inward, and the seat back can then be inclined in the front and rear direction. The operations described above occur substantially simultaneously at only slightly different times.

Embodiment 2

Figure 5:
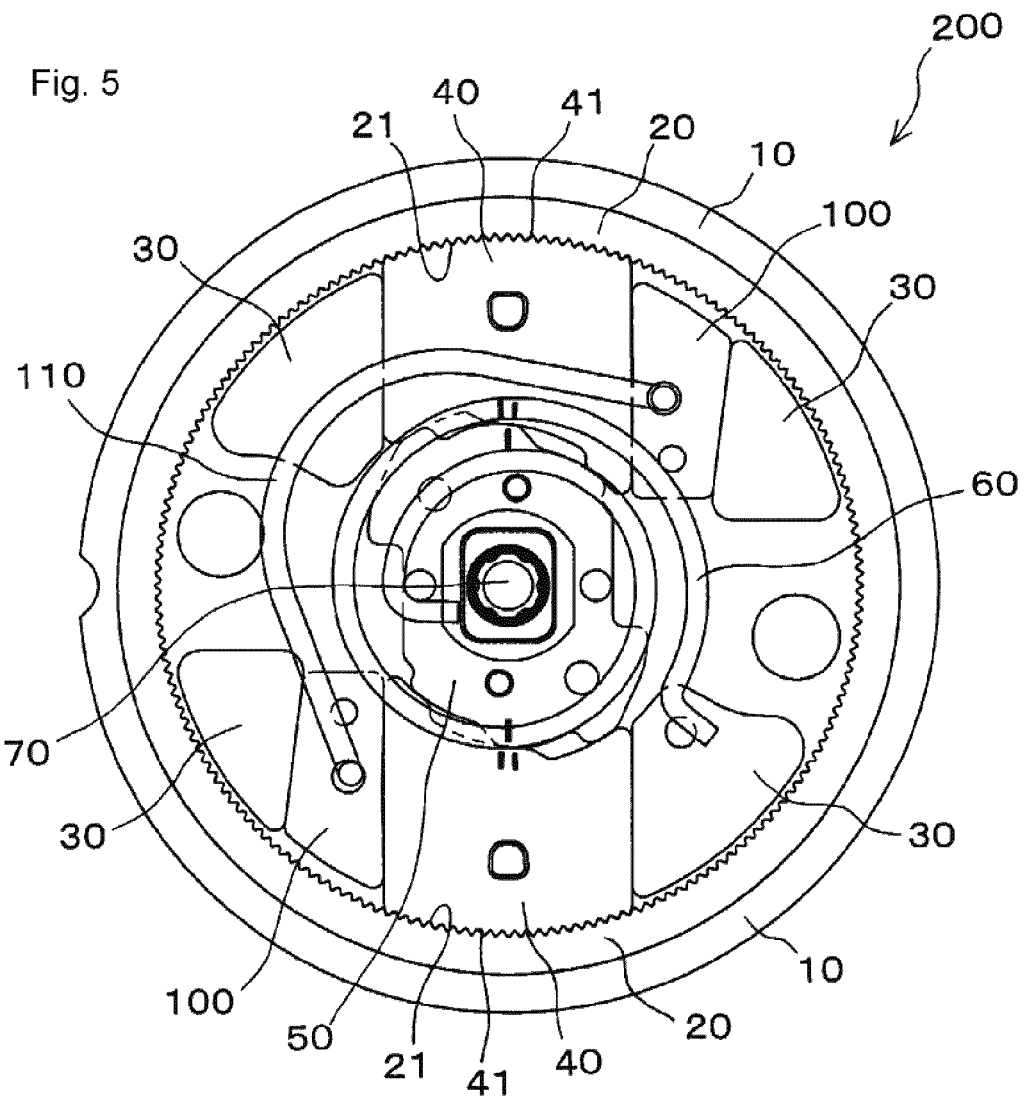
FIG. 5 illustrates a reclining device according to a second embodiment, showing the inside device, in which a gear plate is extended to engage with an inner teeth portion.

FIG. 5 illustrates a reclining device 200 according to a second embodiment. The reclining device 200 is the same as that of the first embodiment in many respects. Particular points of difference are described, but descriptions of similar features are omitted. In the second embodiment a vertical torsion spring 60 imparts a rotational force to the cam 50 as shown in FIG. 5. In this embodiment, the link plate 120 in particular is not shown for the convenience of description. The reclining device 200 may though include the link plate 120. In this second embodiment, the single torsion spring 60 imparts the rotational force to the cam 50. The reclining device 200 can be constructed of fewer component parts than those in the first embodiment.

Embodiment 3

Figure 6:
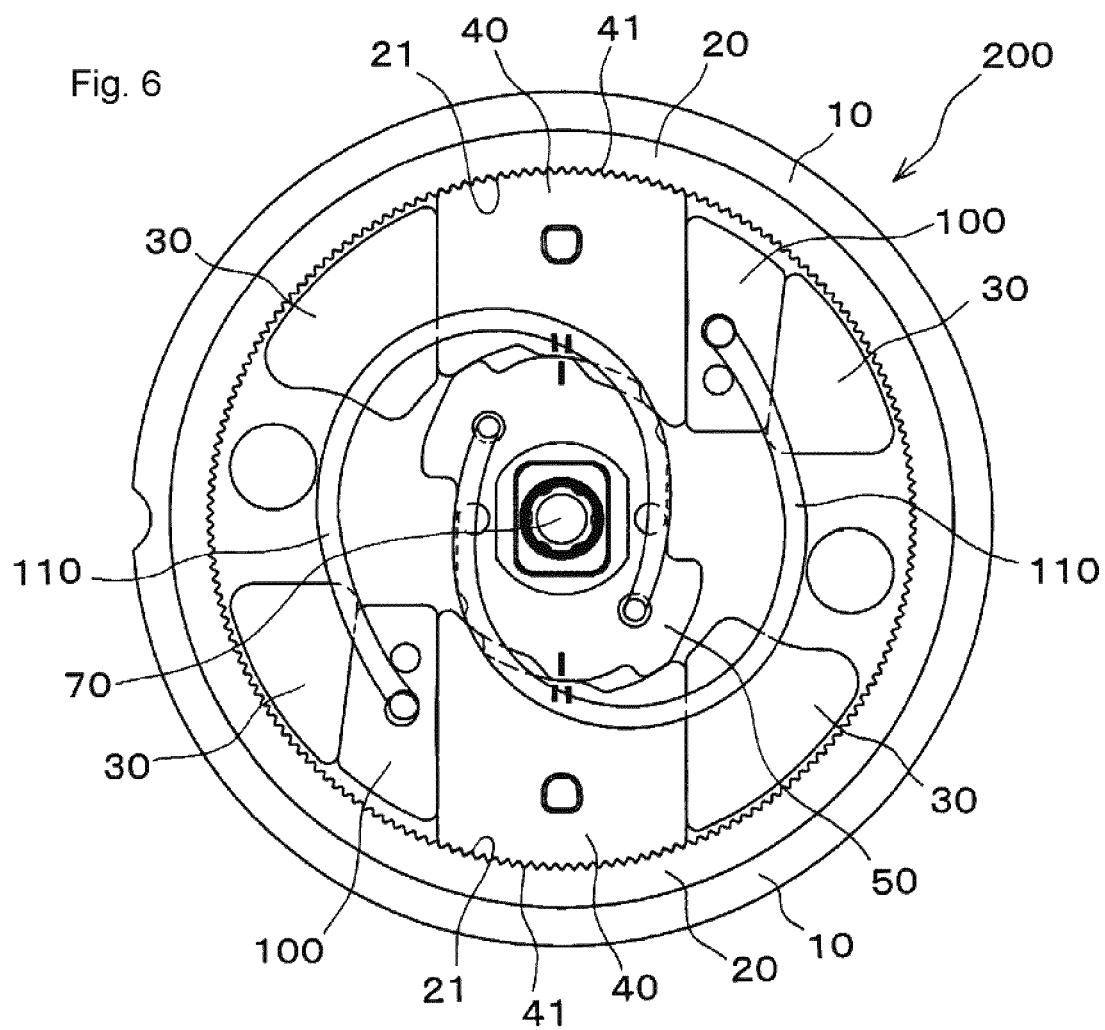
FIG. 6 illustrates the reclining device according to a third embodiment, showing the inside of the device, in which a gear plate is extended to engage with an inner teeth portion.
Figure 7:
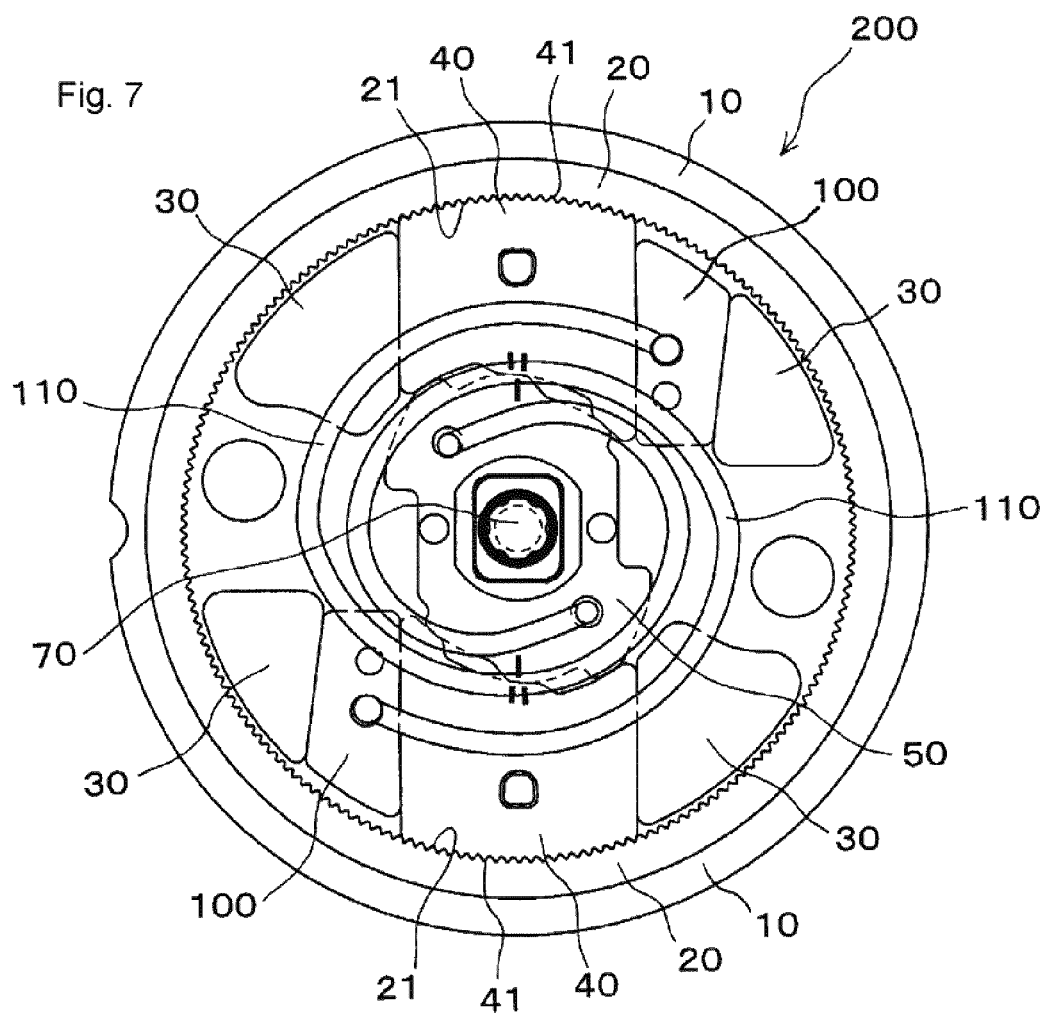
FIG. 7 illustrates the reclining device of FIG. 6, showing the inside device provided with a torsion spring according to another embodiment.
Figure 8:
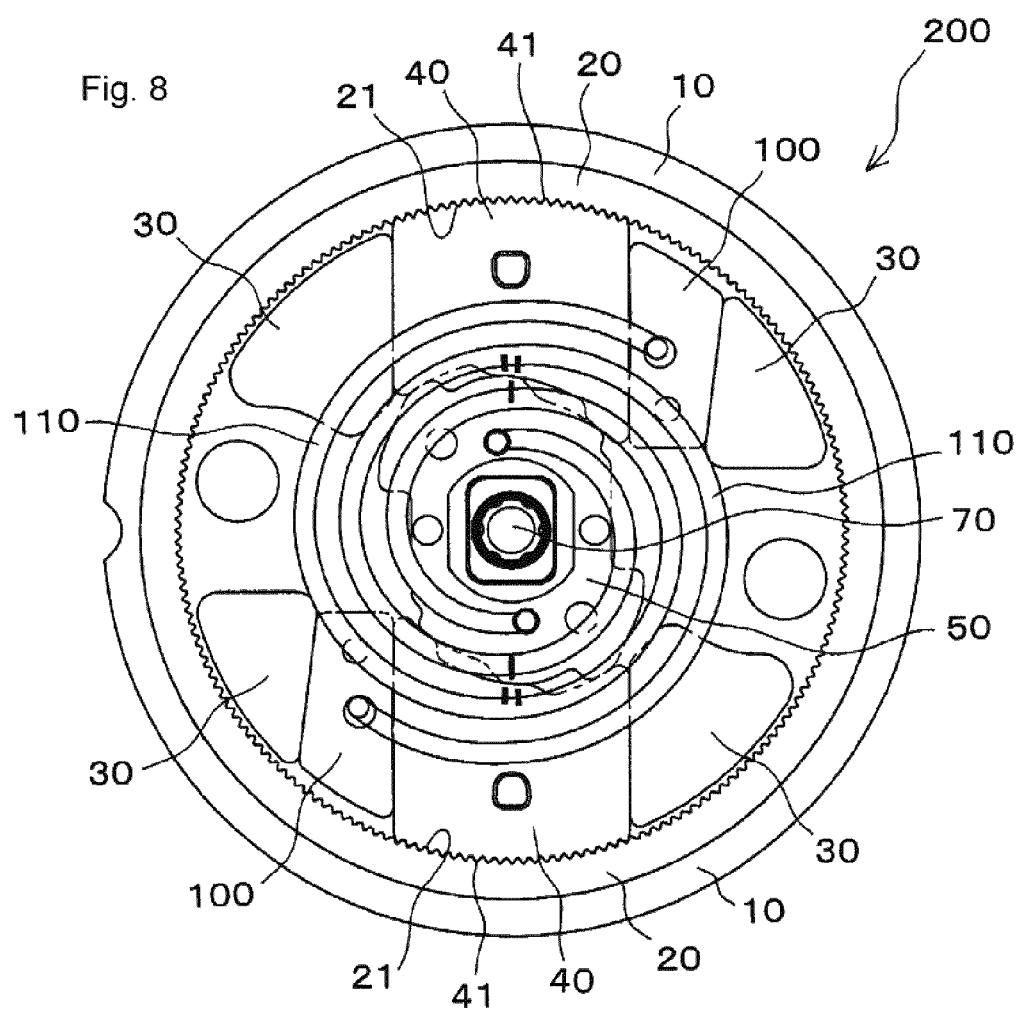
FIG. 8 illustrates the reclining device of FIG. 6, showing the inside of the device provided with a torsion spring according to another embodiment.

FIG. 6 illustrates a reclining device 200 according to a third embodiment. The reclining device 200 according to this embodiment is the same as the first embodiment in many respects. Points particularly different from those of the first embodiment are described here, but descriptions of identical features are omitted. In this third embodiment, a pair of torsion springs 110, ends of which are attached to the pair of movable guides 100, impart a rotational force to the cam 50 as shown in FIG. 6. Accordingly, the pair of torsion springs 110 is engaged with the cam 50 and the pair of the movable guides 100. The pair of torsion springs 110 is disposed on a diagonal line symmetrically with respect to the center shaft 70. The cam 50 is thereby imparted uniformly with a rotational force from two directions. Consequently, in this embodiment the cam 50 is prevented from being driven by a force in an eccentric direction. The cam 50 can thus be rotated around the center of the base plate 10. A pushing force from the cam 50 is therefore uniformly imparted to both of the lock gears 40. Accordingly, the outer teeth 41 of the lock gears 40 are engaged and locked reliably with the inner teeth 21 of the gear plate 20. In this third embodiment, the pair of torsion springs 110 is attached to the cam 50, and the respective movable guides 100 and the torsion springs 110 are disposed on a diagonal line with respect to the center shaft 70. The invention is not particularly limited to the above arrangement however. If the rotational force can be imparted by disposing the cam 50 on the diagonal line, the following arrangement may be employed. That is, the movable guides 100 may be disposed adjacent to the engagement portions on the cam 50, and the cam 50 and the movable guides 100 may be linked with each other. The pair of torsion springs 110 is not limited to the configuration shown in FIG. 6. Either of configurations illustrated in FIG. 7 or FIG. 8 may be employed. In the third embodiment, the link plate 120 is not illustrated, for the convenience of description. Needless to say though, the link plate 120 may be provided.

Embodiment 4

Figure 9:
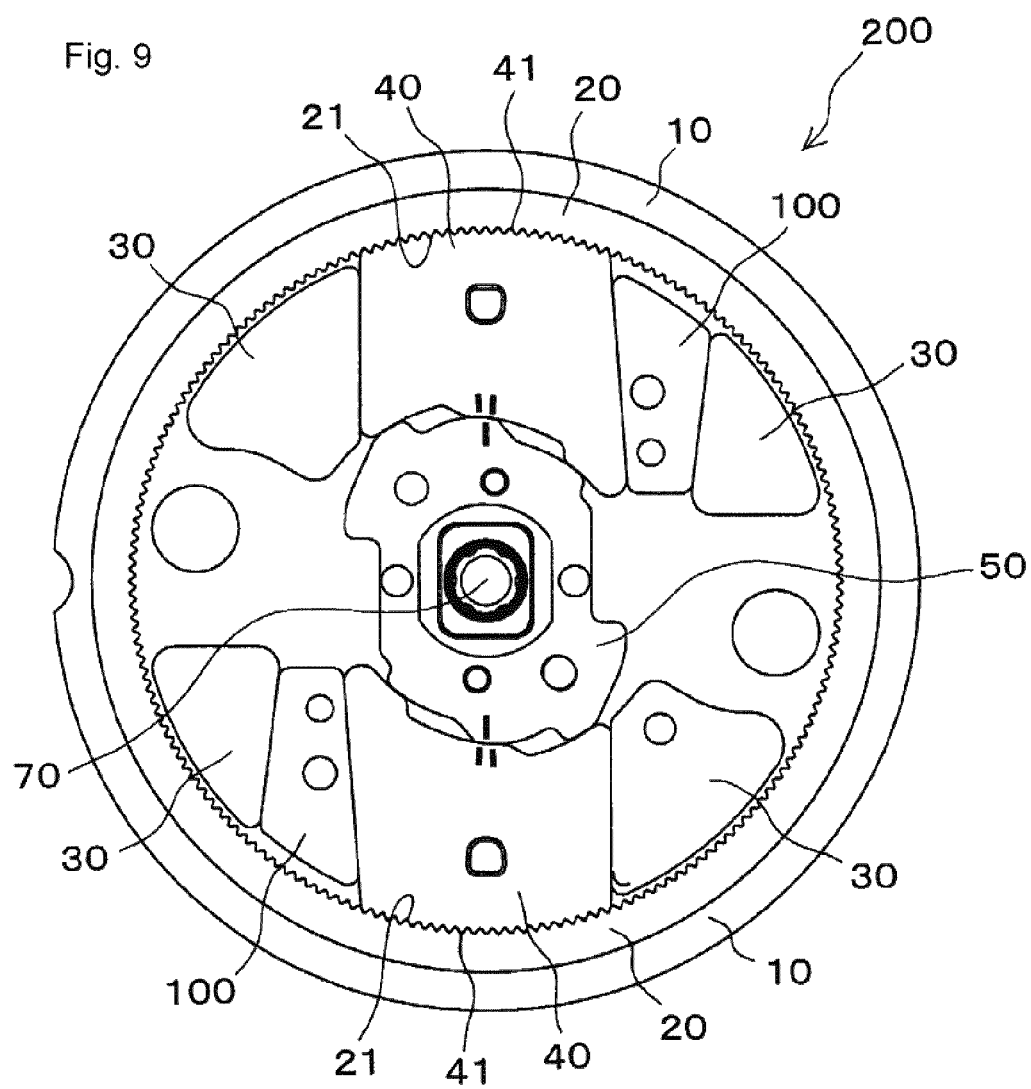
FIG. 9 illustrates a reclining device according to a fourth embodiment, showing the inside of the device, in which a gear plate is extended to engage with an inner teeth portion.

FIG. 9 illustrates a reclining device 200 according to a fourth embodiment. The reclining device 200 in this embodiment is the same as that of the first in many respects. Particular points of difference are described, but descriptions of identical points are omitted. As shown in FIG. 9, in this embodiment each of the lock gears 40 is formed with a width that gradually decreases from the inner end toward the outer end. The sliding face of each the lock gears 40 adjacent the fixed guide 30 is parallel to the lock gear's direction of movement. Each of the lock gears 40 thus includes an inclined surface adjacent the movable guide 100. The movable guide 100, which has a wedge shape, is interposed between the inclined surface and the fixed guide 30. When the sliding faces are brought into close contact with each other and the outer teeth 41 of the lock gears 40 are engaged with the inner teeth 21 of the gear plate 20, the gear plate 20 is locked and prevented from rotating. On the other hand, when unlocking the seat, the center shaft 70 rotates to release the engagement between the outer teeth 41 of the lock gears 40 and the inner teeth 21 of the gear plate 20. In the fourth embodiment, the contact faces between the lock gears 40 and the movable guides 100 are inclined with respect to the directions of movement of the lock gears 40. Therefore, even when each of the lock gears 40 is pulled inward, the lock gear 40 and the movable guide 100 can be separated from each other without generating any friction between them. When the fourth embodiment is unlocked, even when the movable guides 100 are pushed outward by the link plate 120, the lock gear 40 is pulled smoothly inward. The reclining device 200 of this embodiment can be made from fewer component parts. Needless to say though, the link plate 120 may also be employed.

Embodiment 5

Figure 10:
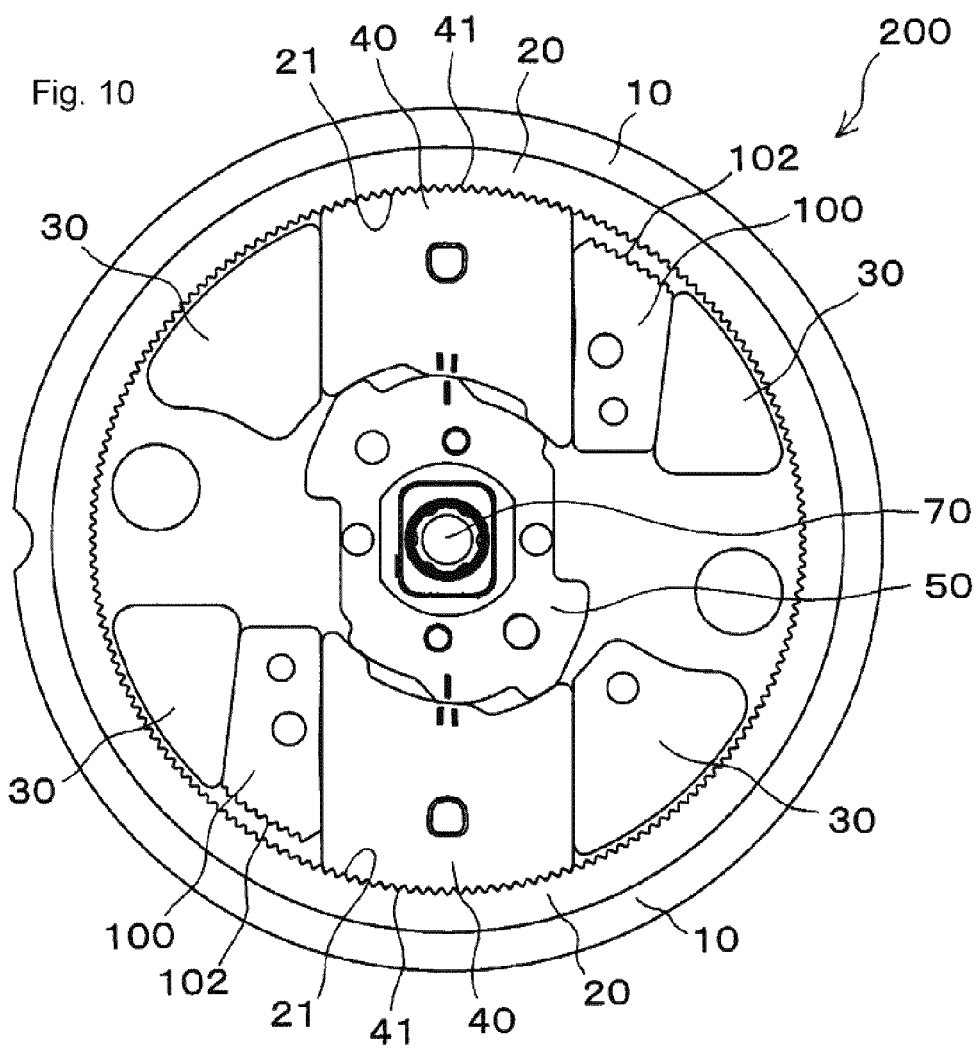
FIG. 10 illustrates a reclining device according to a fifth embodiment, showing the inside of the device, in which a gear plate is extended to engage with an inner teeth portion.
Figure 11:
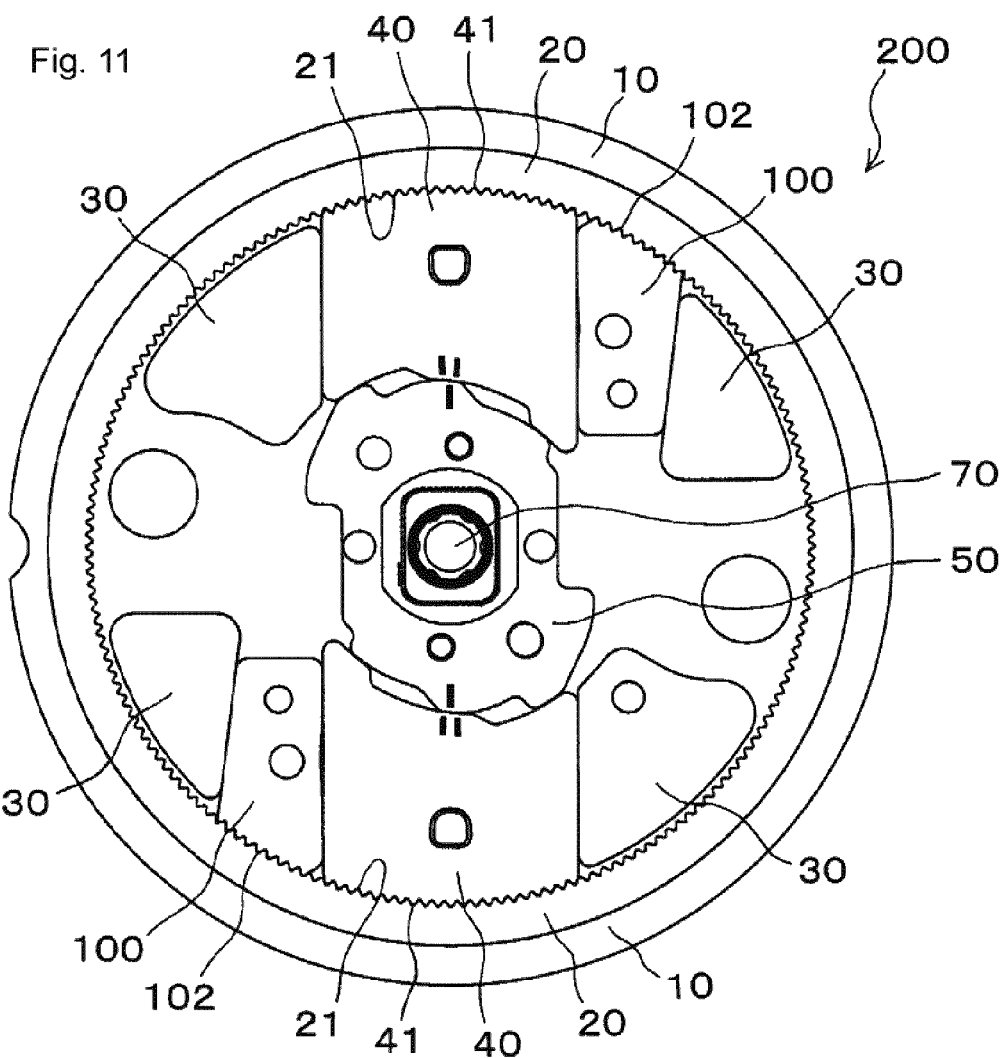
FIG. 11 illustrates the reclining device of FIG. 10, showing a state in which an overload is applied to the device.
Figure 16B:
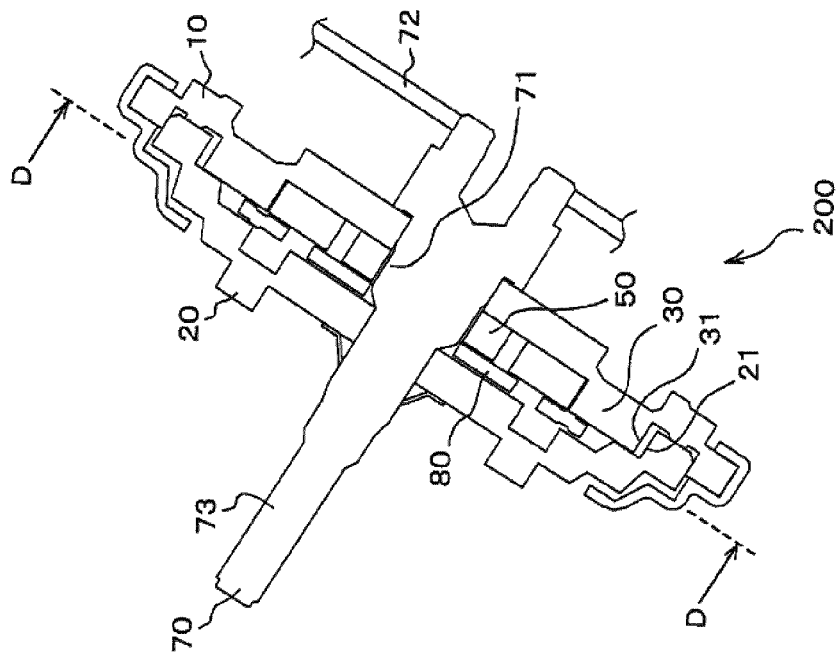
FIGS. 16A and 16B illustrate the reclining device shown in FIGS. 15A and 15B, in a state in which the reclining lock is released.
Figure 16A:
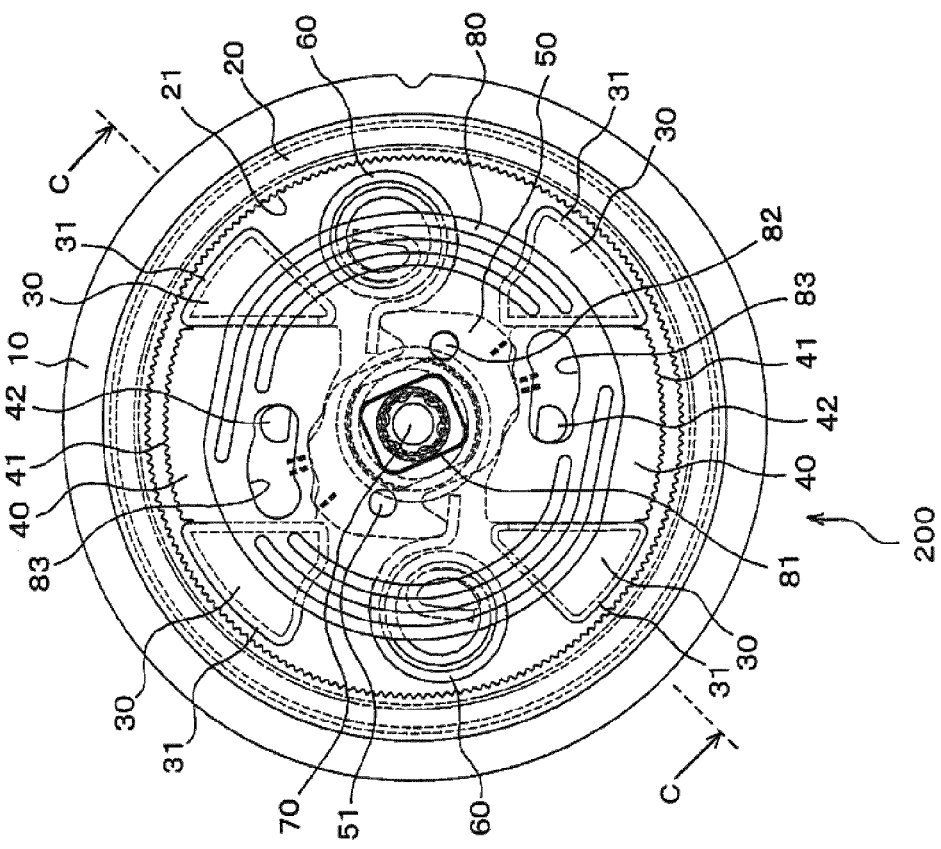

FIGS. 10 and 11 illustrate a reclining device 200 according to a fifth embodiment. The reclining device 200 in this embodiment is the same as the first embodiment in many respects. Points particularly different from those in the first embodiment are described below, but descriptions of identical points are omitted. As shown in FIG. 10, in the fifth embodiment each of the movable guides 100 has outer teeth 102 that can engage the inner teeth 21 of the gear plate 20 at the outer end of the movable guide. In this fifth embodiment, when an overload is applied to the reclining device 200 upon a collision of a vehicle or the like, a rotational load is transmitted from the gear plate 20 to the lock gears 40, and the lock gears 40 push the movable guides 100 between the fixed guides 30 and the lock gears. The movable guides 100 have a width that gradually decreases from their outer ends toward their inner ends. The movable guides 100 are therefore pushed outward along the base plate 10 as shown in FIG. 11. The outer teeth 102 on the outer ends of the movable guides 100 approach the inner teeth 21 of the gear plate 20 and engage with them. The movable guides 100 thereby assist the lock gears 40 in their restraint of the rotation of the gear plate 20. That is, in the fifth embodiment, when an overload is applied to the reclining device 200 in a vehicle collision or the like, the movable guides 100 combine with the lock gears 40 to restrain the gear plate 20 from rotating. Unintended inclination of the seat back can thus be prevented during a vehicle collision. In the fifth embodiment, the link plate 120 is not particularly shown for the convenience of description. The link plate 120 may nevertheless be provided.

Embodiment 6

FIG. 12 is an enlarged view in the vicinity of a movable guide 100 in a reclining device 200 according to a sixth embodiment. The reclining device 200 in this embodiment is the same as that of the first embodiment in many respects. Therefore, points of particular difference in comparison with those of the first embodiment are described here, but descriptions of identical points are omitted. In the sixth embodiment, as shown in FIG. 12, the movable guide 100 has a contact portion 103 that comes into close contact with a fixed guide 30 at the outer end side of a sliding surface on the movable guide 100 adjacent the fixed guide 30. A step portion 104 forms a gap between the fixed guide and the movable guide 100. With this arrangement, the movable guide 100 comes in close contact with the fixed guide 30 only at the contact portion 103. Therefore, in this embodiment even when some deviation is present in the dimensions of the fixed guide 30, the movable guide 100 contacts the fixed guide 30 only at its outer end. Mechanical play in the front and rear direction of the seat back can thereby be reliably prevented. In this sixth embodiment, the link plate 120 is not explicitly shown for convenience. The link plate 120 may nevertheless be provided.

Embodiment 7

FIGS. 13(a)-13(c) and FIGS. 14(a)-14(c) illustrate a reclining device 200 according to a seventh embodiment and a part of a bracket 300 that constitutes a seat frame of a vehicle seat to which the reclining device 200 is mounted. In the embodiment shown in FIGS. 13(a)-13(c), convex portions 11 are formed at four points on the rear face of the base plate 10 at the upper, lower, right and left sides of the lock gears 40. The convex portions 11 are inserted into holes 301 formed in the bracket 300 at four points. The four points are then arc-welded to form welded portions 302. The convex portions 11 and the bracket 300 are thereby fixed together so as not be separated from each other. In the embodiment shown in FIGS. 14(a)-14(c), the base plate 10 has flat portions at positions where the lock gears 40 and the movable guides 100 are positioned in the rear face. Two convex portions 11 are formed between the upper and lower lock gears 40. These convex portions 11 are inserted into holes 301 formed at two points in the bracket 300. After that, the portions where the periphery of the convex portions 11 inserted into the holes 301, and the portions at the flat portions on the bracket 300, are laser-welded to form welded portions 302. Both members are thereby fixed together so as not to separate from each other. By employing laser welding in particular, small emboss-processed portions are formed on the base plate 10. It is not necessary moreover to form a large opening in the bracket 300, and plastic forming of the component parts is thus minimized. A vehicle seat having a high strength can thereby be provided.

Embodiment 8

FIGS. 15(a), 15(b), 16(a), 16(b), 17(a), 17(b), 18(a), and 18(b) illustrate a reclining device 200 according to an eighth embodiment. The reclining device 200 according to the embodiment 8 includes a base plate 10, a gear plate 20, fixed guides 30, lock gears 40, a cam 50, springs 60, a center shaft 70, and a link plate 80. These component elements will be described below.

The base plate 10 constitutes a base of the reclining device 200. The base plate 10 is fixed to either of a seat cushion or a seat back of a vehicle seat. The base plate 10 has to be strong enough to support the load of the seat back and the weight of an occupant. The base plate 10 is therefore made of a steel plate by pressing or cutting. In this eighth embodiment, the base plate 10 has a circular exterior formed by pressing the steel plate, and thus the fixed guides 30 are formed as well. The fixed guides 30 are attached to the seat cushion or seat back.

The gear plate 20 is rotatably assembled with the base plate 10 and is fixed to the other of the seat cushion or the seat back (the one not mounted with the base plate 10) on the vehicle seat. The gear plate 20 has inner teeth 21 on its inner periphery at the side opposite to the side that is fixed to the seat back or seat cushion. The inner teeth 21 can engage with outer teeth 41 on the lock gears 40. The gear plate 20 engages with the lock gear 40 to lock the inclination of the seat back in a front and rear direction. The gear plate 20 has to be strong enough to support the load of the seat back and the weight of an occupant. Therefore, the gear plate 20 is made of a steel plate by pressing or cutting. In this eighth embodiment, the gear plate 20 is formed with a circular exterior shape by pressing a steel plate, with inner teeth 21 formed thereon. The gear plate 20 is fixed to the seat back or the seat cushion.

A pair of fixed guides 30 is integrally formed at two eccentric points in the base plate 10 for sandwiching and supporting the lock gears 40. The load of the seat back and the weight of an occupant are applied to the fixed guides 30, and the fixed guides 30 have to be strong enough to support this load. The fixed guides 30 are therefore formed from a steel plate by pressing or cutting. In this embodiment, the fixed guides 30 are formed by pressing the steel plate from the rear side of the plate using dies.

In this embodiment, the mechanical strength of the fixed guides 30 must be lower than that of the gear plate 20 and the lock gears 40. The reason for this is described below. Specifically, when a large load is applied to the reclining device 200 (in an emergency), the fixed guides 30 are pushed and deformed by the lock gears 40, and thereby the outer end portions 31 of the fixed guides 30 come into contact with the inner teeth 21 of the gear plate 20.

The outer end portions 31 of the fixed guides 30 are preferably disposed as close as possible to the front ends of the inner teeth 21 of the gear plate 20. With this arrangement, when the fixed guides 30 are deformed, the outer end portions 31 are further reliably engaged with inner teeth 21 of the gear plate 20.

Furthermore, the fixed guides 30 are preferably have a thickness that ensures that the fixed guides 30 are maintained in close contact with the gear plate 20 when the base plate 10 and the gear plate 20 are assembled. With this arrangement, when the fixed guides 30 are deformed, the gear plate 20 restricts the deformation of the fixed guides 30 in a thickness direction. Most of the deformation of the fixed guides 30 is thus utilized for biting into the inner teeth 21 of the gear plate 20.

The side faces of the lock gears 40 are parallel to one another so that the lock gears 40 slide between the fixed guides 30. The lock gears 40 have outer teeth 41 on one edge between the side faces of the gears. These outer teeth 41 can engage with the inner teeth 21 on the gear plate 20. When the outer teeth 41 engage with the inner teeth 21 of the gear plate 20, the lock gears 40 primarily bear the load from the gear plate 20. The lock gears 40 must therefore be strong enough to bear this load. The lock gear 40 is preferably formed by first forming a base metal by pressing or cutting a steel plate, and then subjecting the steel plate to quench hardening or forging. In this eighth embodiment, the lock gears 40 are formed of a steel plate, and are pressed and subjected to quench hardening. The lock gears 40 are formed with projections 42 that allow them to be joined with the link plate 80.

The cam 50 is disposed in a substantially central area of the base plate 10 with a shaft 70 inserted through the cam. The cam 50 rotates along with the shaft 70 to control the sliding movements of the lock gears 40. When the cam 50 rotates, the lock gears 40 thus engage with or disengage from the gear plate 20 to thereby lock or unlock the inclination of the seat back provided with the reclining device 200 in a front and rear direction. In this embodiment, the cam 50 has a rectangular hole 52 that allows a rectangular-shaped portion 71 of the center shaft 70 to be inserted through it. The cam 50 also has two projections 51 that allow a link plate 80 to be connected to it.

The springs 60 impart a rotational force to the cam 50 to keep the lock gears 40 engaged with the inner teeth 21 of the gear plate 20. This eighth embodiment uses spiral springs for the springs 60. One end of each of the springs 60 engages with the cam 50; the other end of each spring engages with an engagement projection on the base plate 10. The invention is not limited though, to this arrangement. A spring may be mounted on the center shaft 70 to thereby provide the required rotational force.

The center shaft 70 is inserted into a through hole in central areas of both the base plate 10 and the gear plate 20 to thereby support the base plate 10 and the gear plate 20 coaxially. An operation lever 72 is attached to the center shaft 70 as a separate member. When an occupant operates the operation lever 72 manually, the cam 50 and the link plate 80, through which the operation lever 72 is inserted, rotate simultaneously between the base plate 10 and the gear plate 20. The lock gears 40 thereby engage with or disengage from the gear plate 20. In this embodiment, the center shaft 70 is cut from a steel material. To be more precise, the center shaft 70 has a rectangular portion 71 that can be inserted through the rectangular holes 81 at the centers of the cam 50 and the link plate 80. One end of the center shaft 70 is formed to receive operation lever 72; the other has a splined region 73 for connection with a link shaft (not shown). Reclining devices 200 are mounted, at both the right and the left sides, at the joint portion of the vehicle seat. The cam 50 of the reclining device 200 at the left side of the seat and the cam 50 of the reclining device 200 at the right side of the seat are thus rotated symmetrically via the link shaft.

When the cam 50 rotates to disengage the lock gears 40 from the inner teeth 21 of the gear plate 20, the link plate 80 rotates along with the cam 50 to pull the lock gears 40 inward. In this embodiment, the link plate 80 has a rectangular hole 81, through which the rectangular-shaped portion 71 of the shaft is inserted, in the central position of a circular shaped thin plate. The link plate 80 also has a pair of round holes 82 that receive a pair of projections 51 on the cam 50. The link plate 80 also has a pair of elongated holes 83 that receive a corresponding pair of projections 42 on the lock gears 40.

The operation of the reclining device 200 according to the embodiment described above is described below with reference to FIGS. 15(*a*), 15(*b*), 16(*a*), 16(*b*), 17(*a*), 17(*b*), 18(*a*), and 18(*b*).

To lock the seat back to prevent inclination in the front and rear direction, an occupant first releases the operation lever 72. When the operation lever 72 is released, the cam 50, to which a force is imparted in a clockwise direction in the figures, is rotated by the pair of springs 60 as shown in FIG. 15(*a*). The pair of lock gears 40 is pushed to slide outward over the base plate 10 along the fixed guides 30. The outer teeth 41 of the lock gears 40 engage with inner teeth 21 on the inner periphery of the gear plate 20. This locks the seat back and prevents inclination in the front and rear direction.

To unlock the seat back to allow inclination in the front and rear direction, the occupant pulls up or pushes down the operation lever 72. As the operation lever 72 rotates, the center shaft 70, to which the operation lever 72 is attached, rotates likewise in a counterclockwise direction as shown in FIG. 16(*a*). The cam 50 and the link plate 80, through which the center shaft 70 is inserted, thus rotate simultaneously. As the cam 50 rotates, a gap opens between the cam 50 and the lock gears 40. When the outer edges of the elongated holes 83 of the link plate 80 come into contact with the projections 42 on the lock gears 40, the lock gears 40 are then pulled smoothly inward and the gap is thus eliminated. As the lock gears 40 are pulled inward, the seat back is allowed to incline in a front and rear direction. These operations are carried out substantially simultaneously.

In the reclining device 200 according to this eighth embodiment, when an overload is applied to the reclining device in a vehicle collision or another emergency, the lock gears 40 push against the fixed guides 30. The fixed guides 30 are then deformed as shown in FIG. 18(*a*). The outer end portions 31 of the fixed guides 30 are urged into engagement with the inner teeth 21 on the gear plate 20, with the gear plate 20 thereby fixed in position and the seat back prohibited inclining. When an overload is applied to the reclining device 200 in a collision of a vehicle or the like, the fixed guides 30 are plastically deformed and the outer end portions 31 of the fixed guides bite into the inner teeth 21 of the gear plate 20. The vehicle seat can be reused though, simply by exchanging the reclining devices 200.

Embodiment 9

Figure 19A:
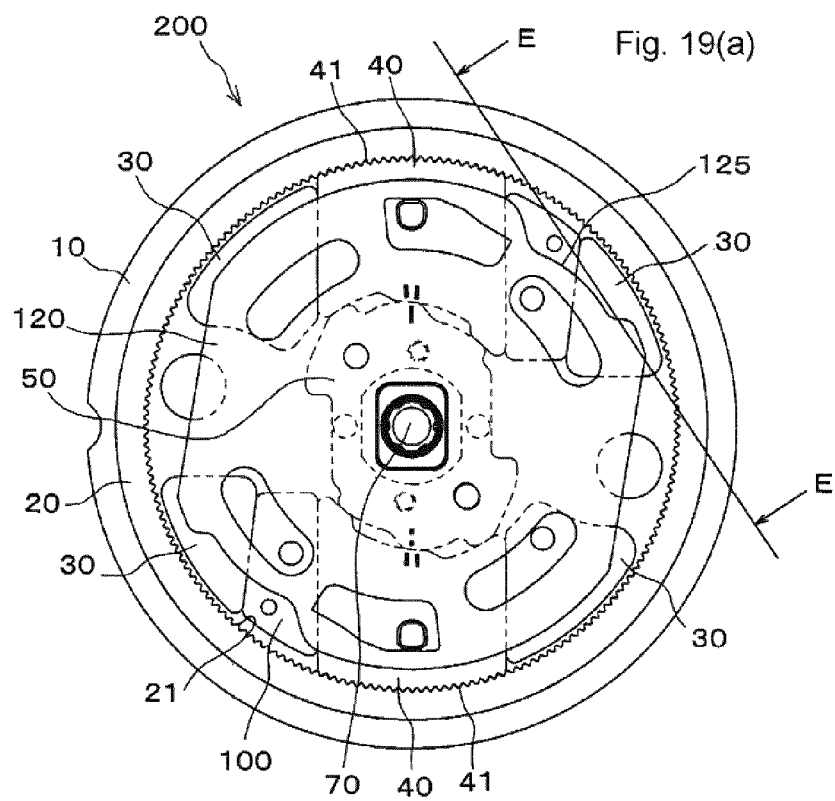
FIG. 19A illustrates a reclining device according to a ninth embodiment, illustrating the inside of the reclining device to show the inner teeth of the gear plate.
Figure 19B:
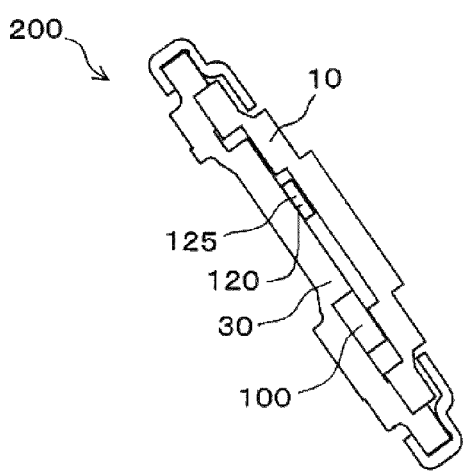
FIG. 19B is a sectional view taken along section line E-E in FIG. 19A.
Figure 19C:
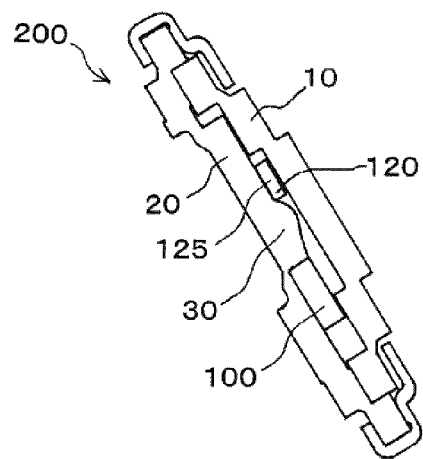
FIG. 19C illustrates a state in which an overload is applied to the reclining device of FIG. 19B and in which the material of the fixed guide has shifted.

FIGS. 19(*a*)-19(*c*) illustrate a reclining device 200 according to a ninth embodiment. Basic structures of the reclining device 200 in this embodiment 9 are identical to those of the first embodiment. In this ninth embodiment, the mechanical strengths of the component members are the same as those in the eighth embodiment. Points of particular difference with the first or eighth embodiments will be described here, with descriptions of identical points omitted. The link plate 120 in this ninth embodiment has a pair of cut-offs 125 at the outer periphery of the link plate 120. The cut-offs 125 are located at points where the outer periphery comes into contact with the outer end portions 31 of the fixed guides 30 when the lock gears 40 are engaged with the inner teeth 21 of the gear plate 20 as shown in FIG. 19(*a*). When the fixed guides 30 are deformed, the deformation of the fixed guides 30 in a thickness direction of the fixed guides is allowed to go beyond the cut-off 125 in the link plate 120, which brings the fixed guides into contact with the gear plate 20. Therefore, in this embodiment when an overload is applied to the reclining device 200 in a vehicle collision or the like, a part of the deformed fixed guides 30 moves out from the cut-off 125 and engages with the gear plate 20. The shifting direction of the material of the deformed fixed guides 30 can thus be controlled as desired, and the fixed guides 30 can thus be engaged with the gear plate 20 more effectively.

Embodiment 10

Figure 20:
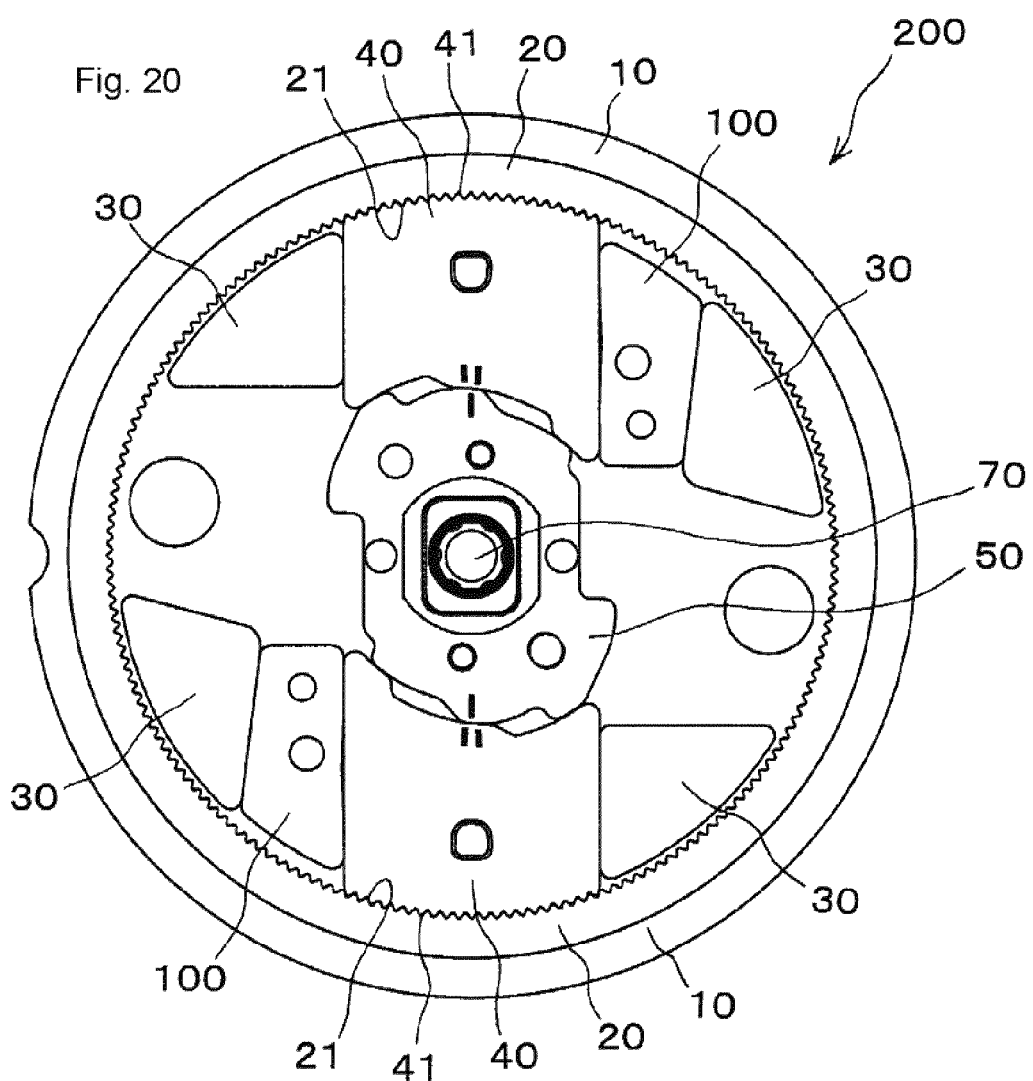
FIG. 20 illustrates a reclining device according to a tenth embodiment, showing the inside of the device, in which a gear plate is extended to engage with an inner teeth portion.
Figure 21A:
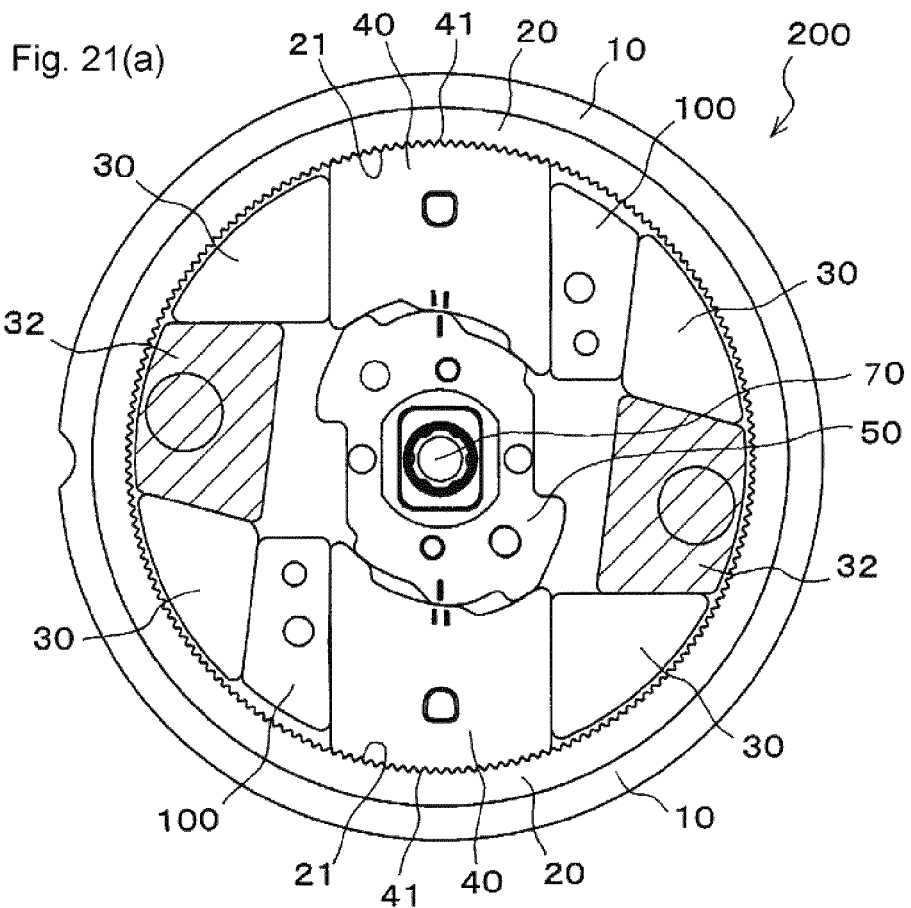
FIG. 21(a) illustrates the reclining device of FIG. 20, in which a guide block is disposed between upper and lower fixed guides to integrate the upper and lower fixed guides with no gap between the members.
Figure 21B:
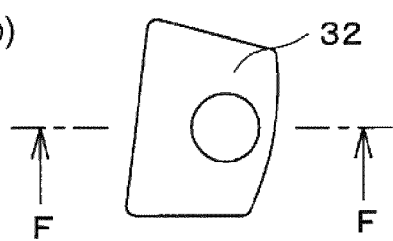
FIG. 21(b) illustrates the bottom face of the guide block shown in FIG. 21(a)
Figure 21C:
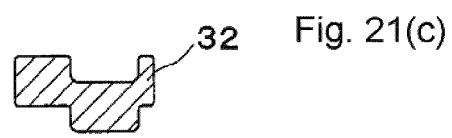
FIG. 21(c) is a sectional view taken along section line F-F in FIG. 21(b).

FIGS. 20, 21(*a*) and 21(*b*) illustrate a reclining device 200 according to a tenth embodiment. The reclining device 200 in this embodiment 10 is the same as that of the first embodiment in many respect. Points of particular difference in comparison with the first embodiment are therefore described, with descriptions of identical points omitted. In this tenth embodiment the inner edge portion of each of the upper and lower fixed guides 30 is linearly formed as shown in FIG. 20. Guide blocks 32 lie between the upper and lower fixed guides 30 as shown in FIG. 21(*a*). One of these guide blocks 32 is depicted in FIGS. 21(*b*) and 21(*c*). The upper and lower fixed guides 30 are thereby connected without a gap. A protruding portion on the bottom face of the guide block 32 enters into an embossed hole at a convex portion in the base plate 10. The guide blocks 32 are thus positioned precisely and prevented from being displaced. When a load is applied to the reclining device 200 in which the base plate 10 includes two pairs of fixed guides 30 according to the invention, the load bears only on the fixed guides 30 on a diagonal line in the four fixed guides 30. Since the fixed guides 30 are formed by pressing (emboss pressing) the base metal that constitutes the base plate 10, a thin portion is generated in an area where the bottom end portion of the fixed guide 30 is located. The thin portion is inferior in strength in comparison with the other portions of the base plate 10. When an extremely large load is applied to the reclining device 200, the base plate 10 may thus break at the thin portion. The guide block 32 is therefore provided between the upper and lower fixed guides 30*a* in this tenth embodiment in order to integrate the upper and lower fixed guides 30 with no gap between them. A load applied to the two fixed guides 80 located on one diagonal line can thereby be shared by the other two fixed guides 30 located on the other diagonal line. Even when a large load is applied to the reclining device 200, the base plate 10 can be prevented from being broken. A reclining device 200 having a high strength can thus be provided.

What is claimed is:

1. A reclining device, comprising:
   a base plate fixed to either one of a seat cushion or a seat back;
   a gear plate having inner teeth, the gear plate being rotatably assembled with the base plate and fixed to the other one of the seat cushion or the seat back;
   two pairs of fixed guides formed on the base plate;
   a pair of lock gears each having outer teeth capable of being engaged with the inner teeth of the gear plate, each of the lock gears being disposed between the respective pair of fixed guides so as to slide along one of the fixed guides;
   a cam that controls the movement of the pair of lock gears to engage the pair of lock gears with the inner teeth of the gear plate;
   a pair of springs that imparts a rotational force to the cam to keep the lock gears being engaged with the inner teeth of the gear plate; and
   a center shaft capable of driving the cam to rotate to thereby disengage the pair of lock gears from the gear plate, wherein
   a mechanical strength of the fixed guides is set to be lower than that of the gear plate and the lock gears, when a large load is applied to the reclining device, the lock gears push the fixed guides to deform the same and cause an outer end portion of the fixed guides to come into contact with the inner teeth of the gear plate to thereby prohibit an inclination movement of the seat back.

2. The reclining device according to claim 1, wherein the fixed guides are disposed so that the outer end portion thereof is positioned close to the front end of the inner teeth of the gear plate, wherein when the fixed guides are deformed, the outer end portion thereof bites into the inner teeth of the gear plate.

3. The reclining device according to claim 1, wherein the fixed guides are formed in a thickness such that, when the base plate and gear plates are assembled with each other, the fixed guides come into substantially close contact with the gear plates, and wherein when the fixed guides are deformed, the gear plate restricts the deformation in a thickness direction thereof.

4. The reclining device according to claim 1, further comprising a link plate that rotates along with the cam to pull the lock gears inward when the cam is rotated to disengage the lock gears from the inner teeth of the gear plate, wherein the link plate includes a cut-off in an outer periphery at a point where, when the lock gears are engaged with the inner teeth of the gear plate, comes into contact with the outer end portion of the fixed guides in the outer periphery of the link plate, and wherein when the fixed guides are deformed, the deformation in a thickness direction thereof is released from the cut-off of the link plate to allow the same to come into contact with the gear plate.

5. A method for operating a reclining device which substantially prevents unintended inclination movement of a seat back upon a vehicle collision or other vehicular emergency situation by substantially eliminating mechanical play in a front and rear direction of the seat back comprising the steps of:
  detachably fixing a base plate to either one of a seat cushion or a seat back;
  rotatably assembling a gear plate having inner teeth with the base plate;
  detachably fixing the gear plate to the other one of the seat cushion or the seat back;
  sliding a pair of lock gears, each having outer teeth capable of being engaged with the inner teeth of the gear plate, outward over the base plate;
  forming two pairs of fixed guides on the base plate, the two pairs of fixed guides having a mechanical strength lower than that of the gear plate and the lock gears;
  rotating a cam with a pair of springs, wherein said rotating is initiated by a release of a seat operation lever;
  engaging the outer teeth of the lock gears with the inner teeth of the gear plate, wherein the engagement substantially locks the seat back and prevents inclination in the front and rear direction;
  pushing the lock gears against the fixed guides, wherein the pushing occurs upon a vehicle collision or other vehicular emergency situation; and
  plastically deforming the fixed guides, wherein the deforming causes the fixed guides to fixedly engage the inner teeth of the gear plate, wherein the fixed engagement substantially prohibits the inclination movement of the seat back.

6. The method of claim 5, wherein each of the lock gears is disposed between the respective pair of fixed guides so as to slide along one of the fixed guides.

7. The method of claim 5, further comprising the step of controlling, via the cam, the movement of the pair of lock gears to engage the pair of lock gears with the inner teeth of the gear plate.

8. The method of claim 5, further comprising the step of imparting a rotational force to the cam, via the pair of springs to keep the lock gears engaged with the inner teeth of the gear plate.

9. The method of claim 5, wherein said reclining device is detachable and replaceable after being activated by a vehicle collision or other vehicular emergency situation.

10. The method of claim 5, further comprising the step of unlocking the seat back to allow inclination in the front and rear direction.

11. The method of claim 10, wherein the unlocking of the seat back further comprises the steps of:
  pulling the seat operation lever;
  rotating the cam;
  opening a gap between the cam and the lock gears; and
  pulling the lock gears inward, wherein the pulling of the lock gears eliminates the gap, and wherein the seat back is allowed to incline in a front and rear direction.

12. The method of claim 5, wherein the deforming of the fixed guides causes an outer end portion to fixedly engage the inner teeth of the gear plate.

13. The method of claim 5, further comprising the step of forming the fixed guides to have a thickness such that, when the base plate and gear plates are assembled with each other, the fixed guides comes into substantially close contact with the gear plates, wherein when the fixed guides are deformed, the gear plate restricts the deformation in a thickness direction thereof.

14. The method of claim 5, further comprising the step of rotating a link plate along with the cam to pull the lock gears inward when the cam is rotated to disengage the lock gears from the inner teeth of the gear plate, wherein the link plate includes a cut-off in an outer periphery at a point where, when the lock gears are engaged with the inner teeth of the gear plate, comes into contact with the outer end portion of the fixed guides in the outer periphery of the link plate, and wherein when the fixed guides are deformed, the deformation in a thickness direction thereof is released from the cut-off of the link plate to allow the same to come into contact with the gear plate.

* * * * *